(12) United States Patent
Mukherjee

(10) Patent No.: US 6,941,024 B2
(45) Date of Patent: Sep. 6, 2005

(54) CODER MATCHED LAYER SEPARATION AND INTERPOLATION FOR COMPRESSION OF COMPOUND DOCUMENTS

(75) Inventor: Debargha Mukherjee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 620 days.

(21) Appl. No.: 10/047,289

(22) Filed: Jan. 14, 2002

(65) Prior Publication Data

US 2003/0133617 A1 Jul. 17, 2003

(51) Int. Cl.⁷ ............................. G06K 9/36; G06K 9/46
(52) U.S. Cl. ................. 382/248; 375/240.19; 382/166; 382/224; 382/264; 382/283
(58) Field of Search ................................ 382/164, 166, 382/173, 224, 239, 240, 248–251, 276, 282, 283; 375/240.19, 240.18

(56) References Cited

U.S. PATENT DOCUMENTS

| | | | |
|---|---|---|---|
| 5,706,417 A | | 1/1998 | Adelson |
| 5,900,953 A | * | 5/1999 | Bottou et al. ................ 358/540 |
| 6,236,757 B1 | * | 5/2001 | Zeng et al. .................. 382/240 |
| 6,266,068 B1 | | 7/2001 | Kang et al. |
| 6,324,305 B1 | | 11/2001 | Holladay et al. |
| 2001/0000314 A1 | | 4/2001 | Queiroz et al. |
| 2001/0000711 A1 | | 5/2001 | Queiroz et al. |
| 2003/0048954 A1 | * | 3/2003 | Matthews ..................... 382/240 |

OTHER PUBLICATIONS

Queiroz ("On Data Filling Algorithms for MRC Layers," Proc. 2000 Int'l Conf. Image Processing, V. 2, Sep. 10–13 2000, pp. 586–589).*
MRC standard (ITU–T T.44 Apr. 1999).*
Izquierdo et al. ("Texture Smoothing and Object Segmentation Using Feature–Adaptive Weighted Gaussian Filtering," Proc. 1998 Int'l Telecommunications Symposium, V. 2, 9–113 Aug. 1998, pp. 650–655).*
De Queiroz R L: "On data Filing Algorithms for MRC Layers" IEEE 2000 0–7803–6297–7/00 vol. 2, Sep. 10, 2000 pp. 586–589 XP010530052.
Cosman P et al: "Memory Efficient Quadtree Wavelet Coding for Compound Images" Signals, systems, and Computers, 1999, Conference Record of the Thirty–Third Asilomar Conference on Oct. 24–27 1999 Piscataway, NJ, USA IEEE, US pp. 1173–1177 XP010373819.

* cited by examiner

*Primary Examiner*—Bhavesh M. Mehta
*Assistant Examiner*—Yubin Hung

(57) ABSTRACT

A method of preparing an image for efficient wavelet transform compression includes the steps of separating the image into foreground and background image layers, and a mask layer. A smoothing filter is applied to interpolate irrelevant pixel values in the foreground and background layers for coder efficiency. The irrelevant pixel values are interpolated as a function of relevant pixels and causal irrelevant pixels within the smoothing filter window.

21 Claims, 18 Drawing Sheets

US 6,941,024 B2

CODER MATCHED LAYER SEPARATION AND INTERPOLATION FOR COMPRESSION OF COMPOUND DOCUMENTS

FIELD OF THE INVENTION

This invention relates to the field of data compression. In particular, this invention is drawn to representation and compression of compound documents.

BACKGROUND OF THE INVENTION

Compound documents may include color images, text, and graphics. Mixed raster content (MRC) is an International Telecommunication Union standard (ITU T.44 04/1999) that specifies a method for efficient representation of a compound document as a union of multiple layers. MRC also specifies methods for compressing the document using pre-determined encoders for the individual layers.

Although the ITU T.44 standard sets forth methods for efficient representation of the document once the layers are identified, the standard does not address decomposition of an MRC document into the individual layers. The decomposition approach, however, may have a significant influence on the compressibility of the resulting layers and thus the size of the compressed document. Thus although numerous distinct decompositions of the document may exist, they will not all yield the same level of compression. Trying each decomposition to identify the one with the optimal rate and quality is intractable.

SUMMARY OF THE INVENTION

In view of limitations of known systems and methods, methods and apparatus for decomposing compound documents for mixed raster content representation and compression are provided.

A method of preparing an image for efficient wavelet transform compression includes the steps of separating the image into foreground and background image layers, and a mask layer. A smoothing filter is applied to interpolate irrelevant pixel values in the foreground and background layers for coder efficiency. In one embodiment, the smoothing filter is a weighted Gaussian filter wherein the weights are a function of the associated pixel causality and relevance.

A method for decomposing an image includes the step of decomposing the image into a plurality of stripes. Each stripe is decomposed into foreground, background, and mask layers. A smoothing filter is applied to interpolate irrelevant pixel values in the foreground and background layers for wavelet transform coding efficiency. In one embodiment, the smoothing filter is a weighted Gaussian filter wherein the weights are a function of the associated pixel causality and relevance.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
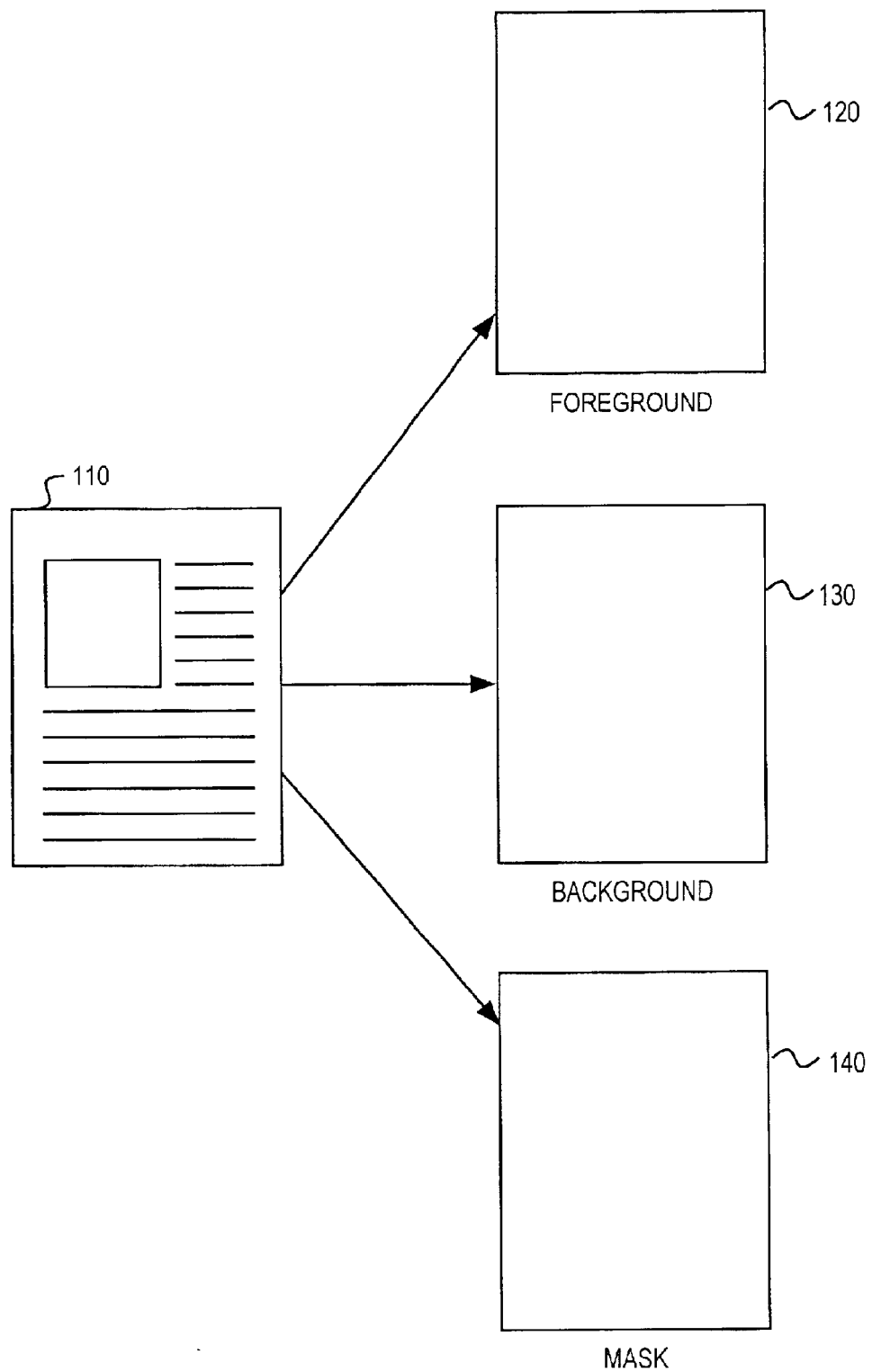
FIG. 1 illustrates a multilayer representation of a compound document.

In one embodiment MRC represent a compound document 110 sing three layers (background 130, foreground 120, and mask 140) as illustrated in FIG. 1. The background and foreground are image layers and the mask layer is binary (i.e., 1bit per pixel). Once represented as layers, the document may be compressed. The background and foreground layers may be encoded at a lower resolution than the original, but the layer model may be extended to N layers by adding layers in (image, mask) pairs.

To reconstruct the original document, the background and foreground layers are reconstructed from their corresponding compressed layer data. The mask identifies whether a pixel of the reconstructed document is to be provided by the reconstructed background or the reconstructed foreground layers.

The standard supports the use of JPEG-1 (joint Photographic Experts Group) or JBIG (Joint Bilevel Image Experts Group) compression for the foreground and background image layers. The standard supports Group 3 (G3), Group 4 (G4), and JBIG compression for the mask layer. Minimal modifications to the standard would be required to include support for JBIG2 and JPEG 2000 compression which are more efficient than JBIG and JPEG-1, respectively.

Figure 2:
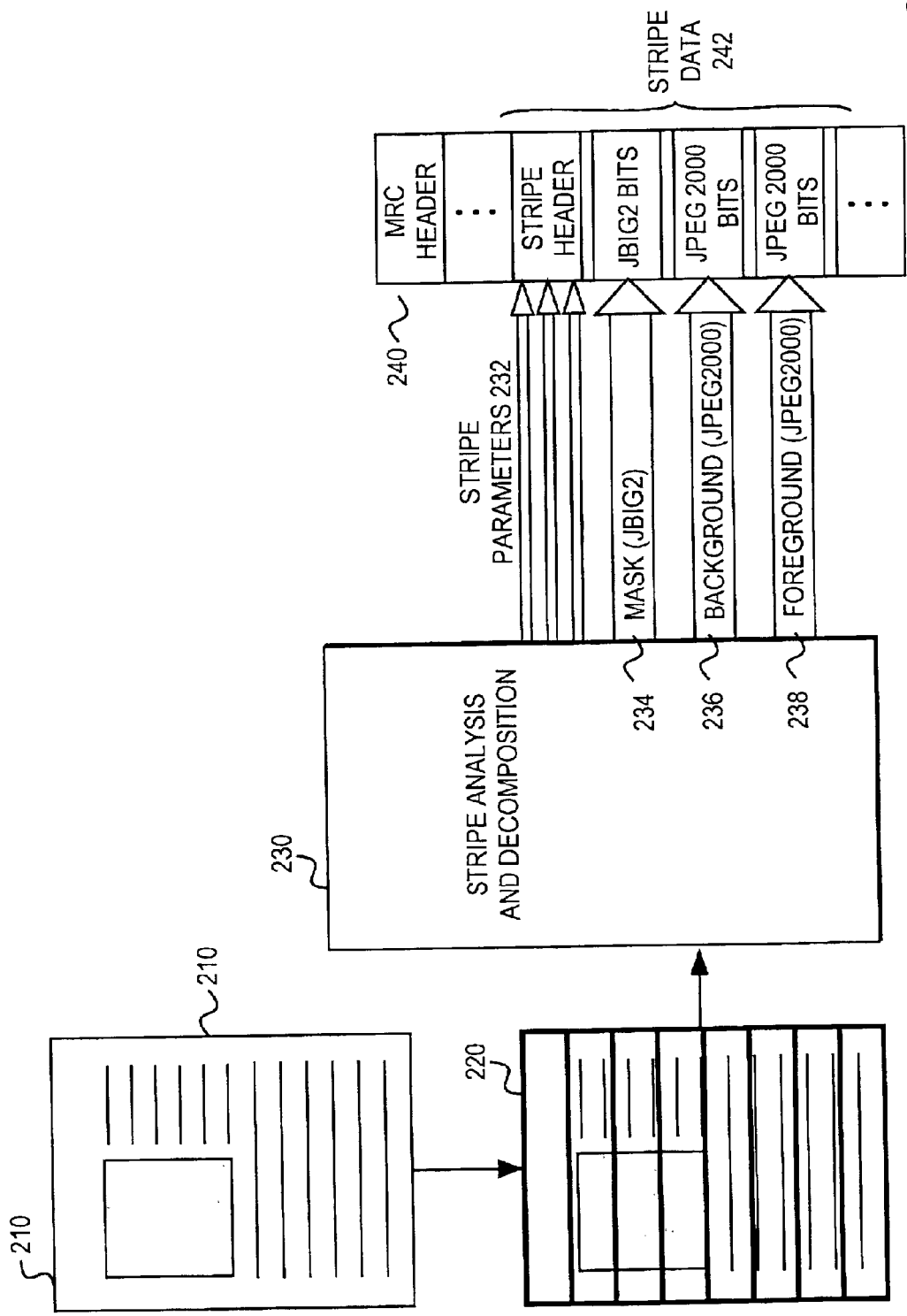
FIG. 2 illustrates stripe decomposition of the compound document.

MRC supports coding the document as a series of stripes. FIG. 2 illustrates stripe decomposition of a compound document 210. The document is striped for analysis. The stripes of the striped document 220 are analyzed and decomposed in block 230. The background 236, foreground 238, and mask 234 data for each stripe as well as stripe parameters 232 are encapsulated in the MRC bit stream 240 as stripe data 242. The MRC standard does not address the specifics of the analysis or decomposition provided by block 230.

One goal of the decomposition process is to obtain a new optimal decomposition in terms of compactness of the coded bitstream and quality of the reconstructed image while staying within a reasonable complexity constraint. Optimization of the coded bitstream requires consideration of the characteristics of the encoders applied to the individual layer data. In the illustrated embodiment, block 230 uses JBIG2 to encode the mask and JPEG 2000 to encode the foreground and background layers and thus must consider the particulars of the JPEG 2000 coder when determining how stripes should be decomposed into the individual layers for compression. In an alternative embodiment, block 230 uses JBIG for the mask and JPEG for the background and foreground layers.

The original JPEG standard is described in "Digital compression and coding of continuous-tone still images: Requirements and guidelines" (ISO/IEC 10918-1:1994) and is sometimes referred to as JPEG1. Information about the JPEG 2000 basic encoding system may be found in the adopted standard "JPEG 2000 image coding system—Part 1: Core coding system" (ISO/IEC 15444-1:2001).

The MRC syntax permits a set of parameters to be transmitted for each stripe. These parameters include spatial offsets and sizes to define the size and position of the coded foreground and background layers. The foreground and background layers may be smaller than the stripe. The mask layer, however, is always full resolution and full size.

Figure 3:
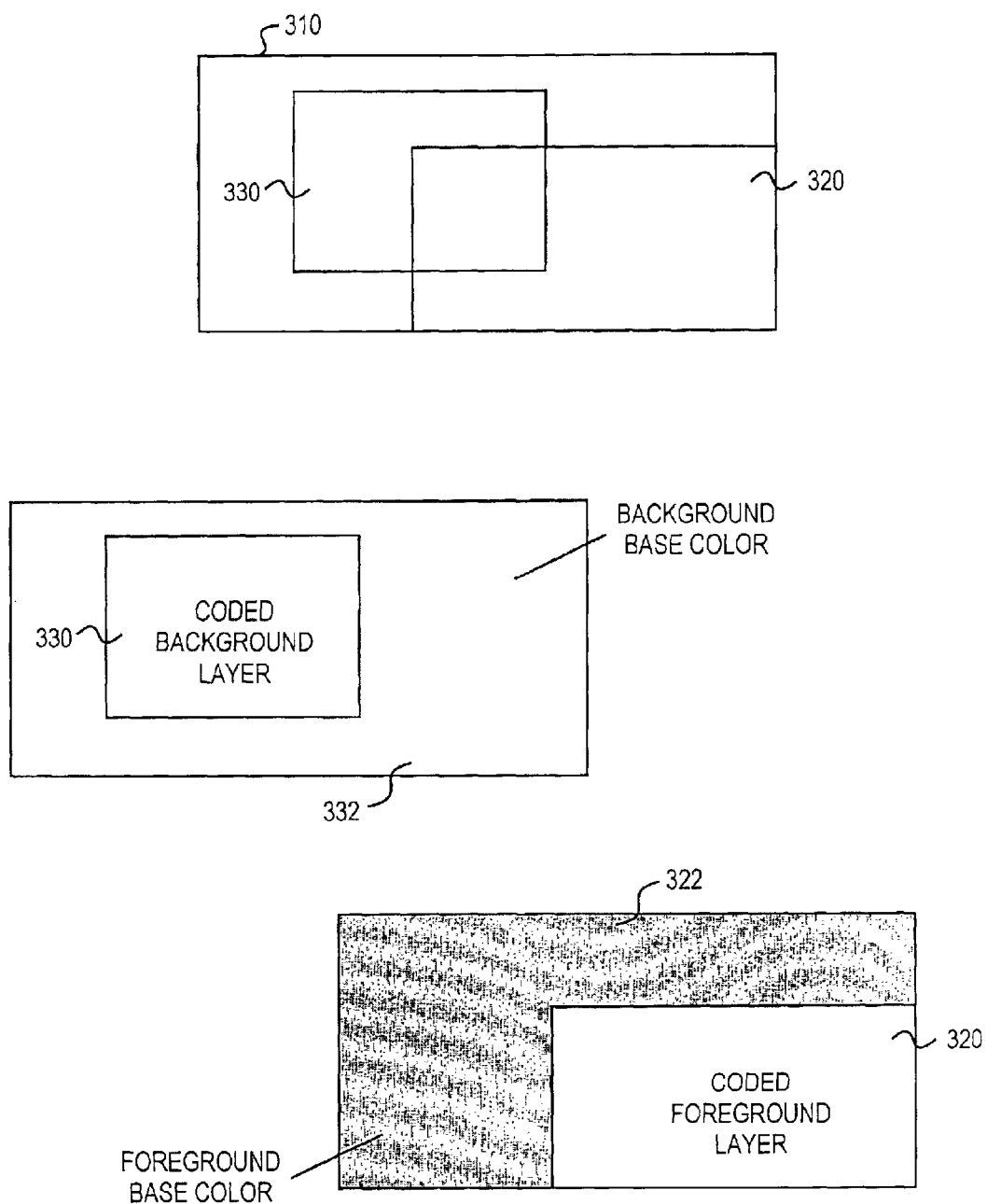
FIG. 3 illustrates coded foreground and background layers of a stripe.

FIG. 3 illustrates a stripe 310 having coded foreground 320 and background 330 layers that are smaller than the stripe. Two parameters represent the foreground and background base color that are used to fill up the foreground and background layers in portions 322 and 332, respectively, outside the coded regions specified by the offset and size parameters.

Once the mask is derived, both the foreground and background layers have "holes" or "don't care pixels" corresponding to pixels that belong to the other layer as determined by the mask. Thus whenever the mask indicates that a particular pixel is sourced from the foreground layer, there is a corresponding "hole" at the same location in the background layer. Such holes or don't care pixels are irrelevant to the reconstruction, but can have a significant affect on compression depending upon their values. Given that the values are irrelevant to reconstruction, they may be modified to achieve more efficient compression for that layer.

Block 230 must analyze a stripe to determine the following information: 1) offsets and sizes of coded foreground and background layers, 2) foreground and background base colors, 3) full resolution mask, 4) interpolation values for the don't care pixels in the foreground and background layers (i.e., JPEG 2000 or JPEG-1 matched interpolation), 5) JPEG 2000/JPEG-1 parameters for the foreground and background layers, and 6) JBIG/JBIG2 parameters for the mask layer.

Figure 4:
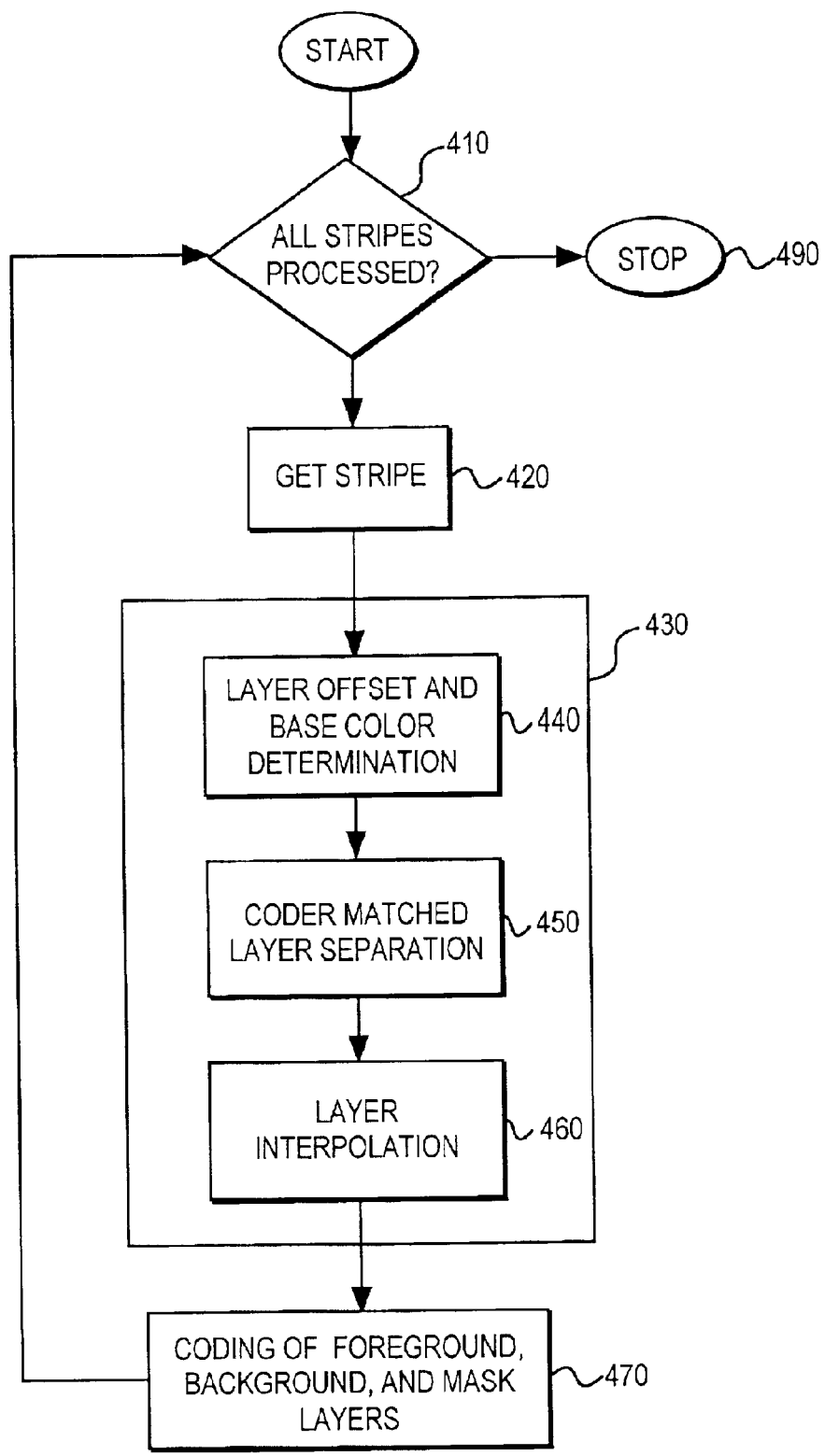
FIG. 4 illustrates one embodiment of an MRC coder process including the stripe analysis process.

FIG. 4 illustrates one embodiment of an MRC coder process including the stripe analysis process. The MRC coder process is operating on stripes of the striped compound document. Step 410 determines whether there are any more stripes to process. If not, then the process is complete in step 490. Otherwise step 420 obtains a stripe for analysis. The stripe analysis portion 430 may be conceptually subdivided into three components. In step 440, the layer offsets, sizes, and base colors are determined. Step 450 performs a coder matched layer separation. In one embodiment, this is a JPEG 2000 matched layer separation. In an alternative embodiment, this is a JPEG-1 matched layer separation.

Step 460 then interpolates the irrelevant don't care pixels to facilitate compression. In one embodiment step 460 interpolates the irrelevant pixels for JPEG 2000 compression in which case the image (foreground and background) layers are JPEG 2000 coded and the mask layer is JBIG2 coded in step 470. In an alternative embodiment, step 460 interpolates the irrelevant pixels to facilitate JPEG-1 compression in which case the foreground and background image layers are JPEG-1 coded and the mask is JBIG coded in step 470. The process continues until all stripes have been processed.

The goal of the first step of the stripe analysis process is to reduce the coded size of the image layers through appropriate selection of base colors and layer sizes and offsets. If a compound document has margins of constant colors, for example, such information can be more economically conveyed through the use of offset and base color parameters as opposed to JPEG 2000 or JPEG-1 encoding. The first step can be further subdivided into the functions of perimeter finding and common area reduction. The functions may be performed substantially simultaneously.

The perimeter finding function attempts to find the thickest margins along the edges of a strip that consists of only two colors so that the residual coded region in the image layers are minimized. A systematic analysis of stripe rows and columns is performed for this function.

Figure 5:
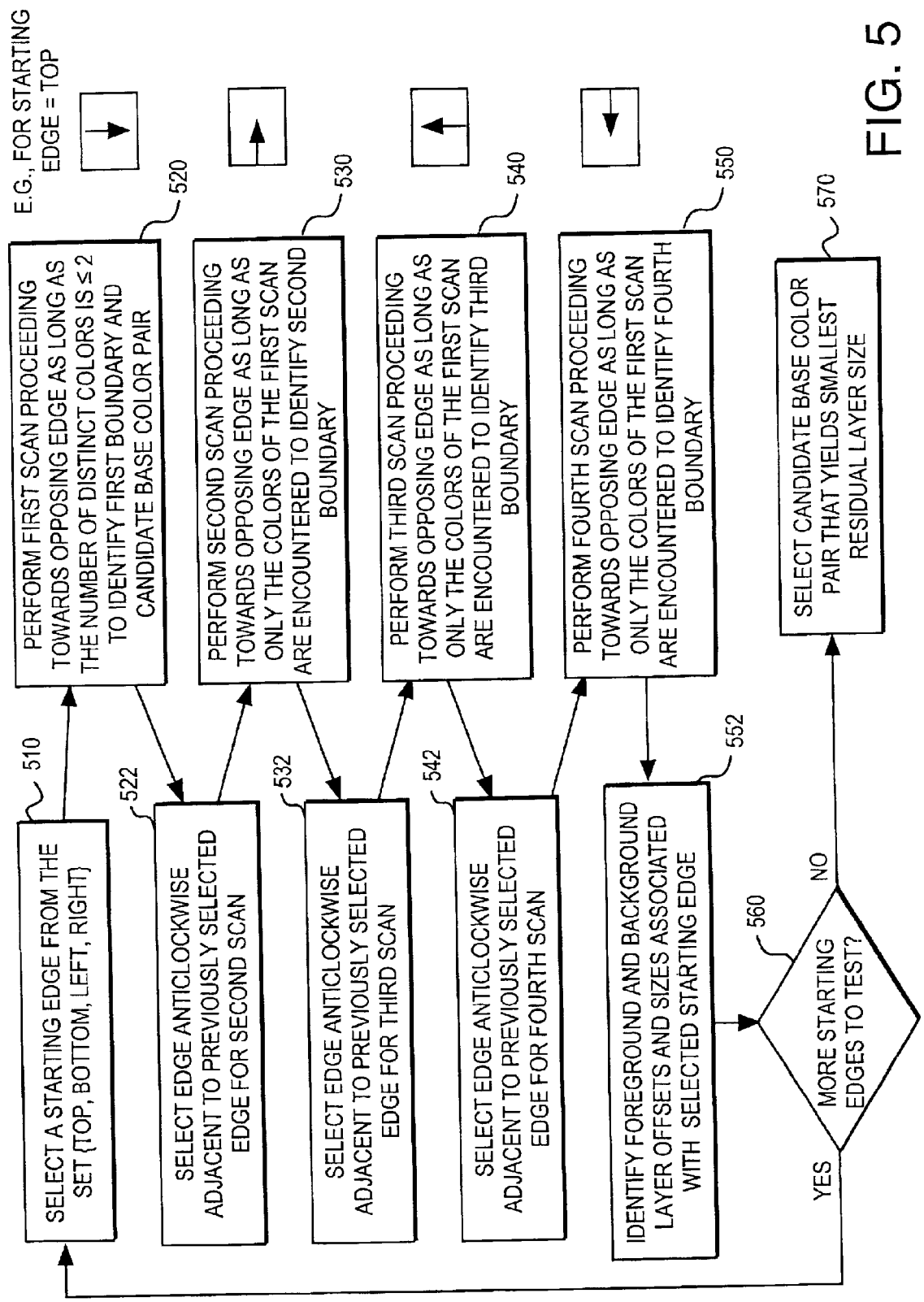
FIG. 5 illustrates the perimeter finding function.

FIG. 5 illustrates the perimeter finding function. Step 510 selects an edge to start with given the set {top, bottom, left, right}. All four will eventually be processed so any edge may be selected initially. For purposes of example, the top edge is presumed the initial selected edge.

A scan is performed on the stripe beginning with the selected edge and proceeding to the edge opposite the selected edge as indicated by step 520. The scan continues until encountering more than two distinct colors. The first two distinct colors become the candidate base color pair. If, for example, the top edge is initially selected row scans beginning at the top edge and proceeding toward the bottom edge are performed until encountering a third color. This marks the first boundary.

Proceeding anticlockwise, another edge is selected in step 522. If the top edge was initially selected, the next edge is the left edge in one embodiment. Scanning is performed beginning with the new edge and proceeding toward its opposite edge in step 530. If the left edge is selected, scanning proceeds along columns until encountering a color that is not a member of the candidate base color pair. This marks the second boundary.

Proceeding anticlockwise, a third edge is selected in step 532. If the top edge was initially selected, the third edge is the bottom edge in one embodiment. Scanning is performed beginning with the third edge and proceeding toward its opposite edge in step 540 until encountering a color that is not a member of the candidate base color pair. This marks the third boundary.

Proceeding anticlockwise, a fourth edge is selected in step 542. If the top edge was initially selected, the fourth edge is the right edge in one embodiment. Scanning is performed beginning with the fourth edge and proceeding toward its opposite edge in step 550 until encountering a color that is not a member of the candidate base color pair. This marks the fourth boundary.

Based on the boundaries obtained through scanning, foreground and background layer offsets and sizes can be determined in step 552. One of the two colors of the candidate base color pair is assigned to the foreground base color while the other member of the pair is assigned to the background base color.

The information obtained so far represents only one candidate pair of base colors and associated offsets. This solution may not be optimal. For example, a different initial scan edge may result in a different candidate base color pair and associated offsets that produce a smaller coded region. Accordingly, step 560 ensures that the process is repeated until a candidate base color pair and associated offsets are determined for each possible starting edge.

After each edge of the stripe has been a starting edge there will be four candidate base color pairs with associated offsets. Thus after all possible starting edges have been processed as determined by step 560, step 570 selects the candidate base color pair (and associated offsets) that result in the smallest coded regions.

At this point, the foreground and background layers are the same size and have the same offsets resulting in a common area for the foreground and background layers. The common area reduction function attempts to reduce the size of the coded foreground or background layer beyond the common area.

Generally, the common area is columnwise scanned from one edge towards the opposing edge. The fraction of pixels having the base color of the selected layer is tabulated for each column. This value is compared with a threshold, $T_F$, typically set to 0.75. A variable $N_F$ is a function of the document resolution. In one embodiment, $N_F$ is selected to correspond to the number of columns required for a 0.25 inches width. As soon as a contiguous run of $N_F$ columns where the fraction of pixels having the selected layer base color falls below $T_F$, the scan is stopped and the background layer is adjusted to start at the beginning of the run.

Figure 6:
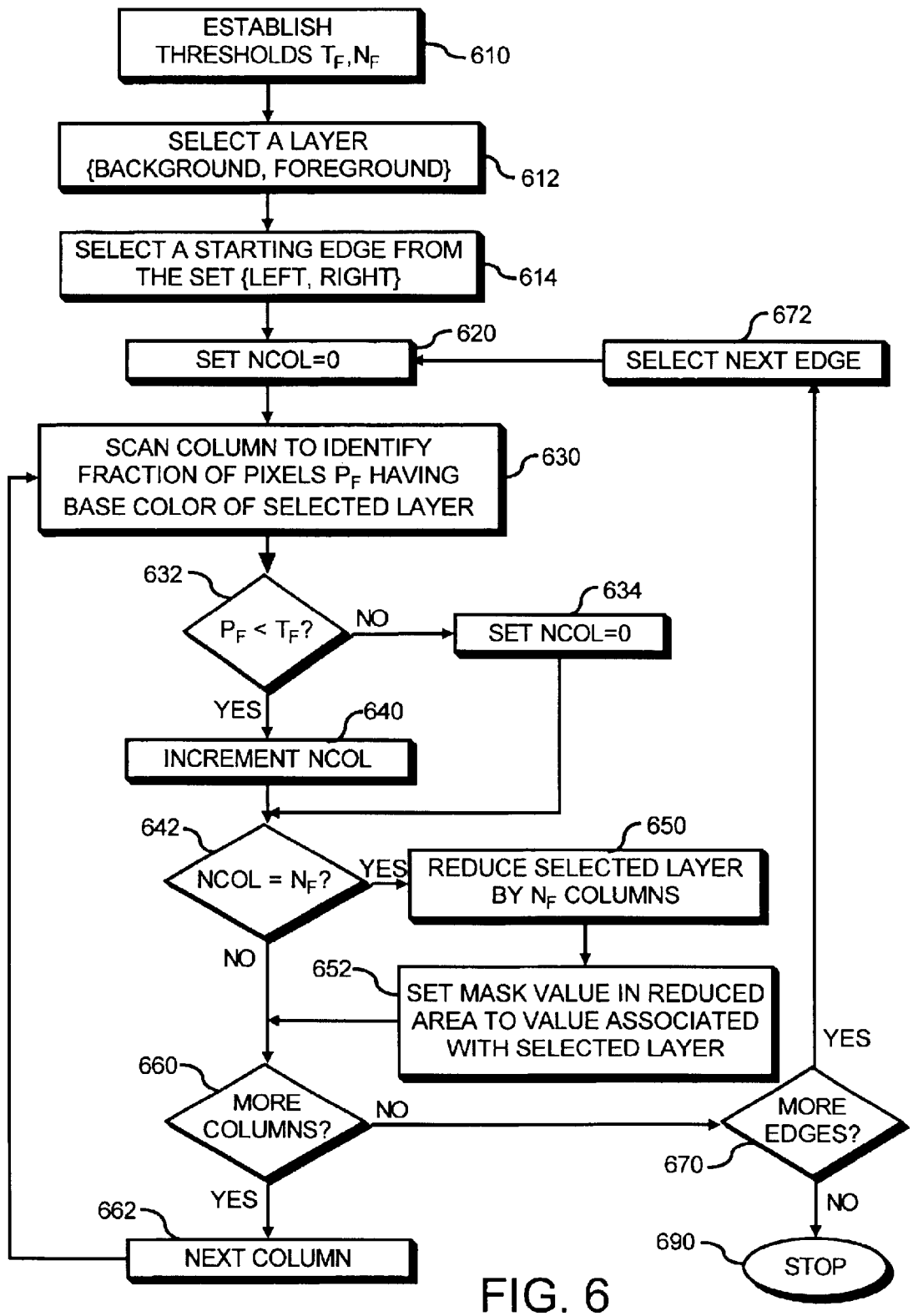
FIG. 6 illustrates one embodiment of the common area reduction function.

FIG. 6 illustrates one embodiment of the common area reduction function. In step 610, threshold variables $T_F$ and $N_F$ are initialized. $T_F$ is a pixel threshold and is set to 0.75 in one embodiment. $N_F$ represents a number of contiguous rows or columns threshold and is a function of the document resolution. In one embodiment, $N_F$ is initialized to a value corresponding to approximately 0.25 inches.

In step 612, a layer is selected for common area reduction. In one embodiment, the common area reduction function begins with the background layer. In step 614, a starting edge of the stripe is selected. In one embodiment, the starting edge is selected from one of the left and right edges.

In step 620 a number of columns variable, NCOL, is set to zero. Step 630 scans a column to identify a fraction of pixels, $P_F$, having the base color associated with the selected layer. If $P_F<T_F$ (e.g., less than 75% of the pixels are associated with the background base color), then NCOL is incremented in step 640, otherwise NCOL is set to zero in step 634. Step 642 determines whether NCOL=$N_F$ thus determining whether there are at least $N_F$ contiguous columns for which $P_F<T_F$.

If not, then step 660 checks whether there are additional columns to be processed. If so, step 662 selects the next column and the process continues with step 630 using the new column.

If so, then step 650 reduces the coded area of the selected layer by $N_F$ columns. This effectively decreases the amount of common area required for coding the selected layer. Accordingly, the mask value in the discarded portion of the common area is set to the value associated with the selected layer in step 652. For a mask convention of 0-background and 1-foreground, in the area discarded from the background layer, the mask value is assigned to 0 (background) for all pixels having the background color, and 1 otherwise. Step 660 then determines whether there are any more columns to process.

If step 660 determines that there are no more columns to process in the common area, step 670 determines if there is another starting edge to process. If not, then the process is completed in step 690. Otherwise, the next edge is selected for processing in step 672 and the process repeats from step 620 with the new edge.

Once the common area reduction of FIG. 6 has been performed for one layer (e.g., background), the process may be repeated for the other layer (e.g., foreground). The foreground and background layers, however, cannot both be reduced from the same sides. Thus if the background layer has been reduced from the left edge of the common area, the foreground cannot be reduced from the left edge. The foreground, however, may be reduced from the right edge if no reduction from the right has previously been made for the background layer. Thus scans for one or both edges of one layer can be skipped entirely. Thus it is necessary to identify the edges for which reduction for a selected layer is successful to eliminate attempting such reduction for the same edges for the next layer.

In one embodiment, the perimeter and common area reduction functions are performed substantially concurrently. Even if a first candidate base color pair yields a larger common area than a second base color pair, the first candidate base color pair may yield a smaller sum of foreground and background layer sizes after common area reduction. Performing perimeter finding and common area reduction functions concurrently enables one to see if any or both of the layers can be further reduced immediately after identifying a pair of candidate colors. Of the four possible candidate pairs, the one that yields the smallest sum of areas of the background and foreground layers is chosen.

The mask values are now assigned based on the results of the analysis. In one embodiment, the lighter (i.e., higher luminance) color of the base color pair is considered the background base color while the darker color is considered to be the foreground base color. The mask is then assigned a 0 or a 1 depending on whether the color of the pixel is the background base color or the foreground base color, respectively. Moreover, if the layers were reduced beyond the common area, the mask values are assigned accordingly (see step 652). For example, if the foreground layer has been reduced, the mask in the discarded region is assigned so that pixels with the foreground base color are assigned 1 while all other pixels are assigned 0. Thus after processing both layers, the mask values for all pixels other than those comprising the intersection of the foreground and background layers has been determined. The result is that the foreground, background, and mask values for all regions of the stripe except the portion represented by overlapped common reduced areas have been determined.

Figure 7:
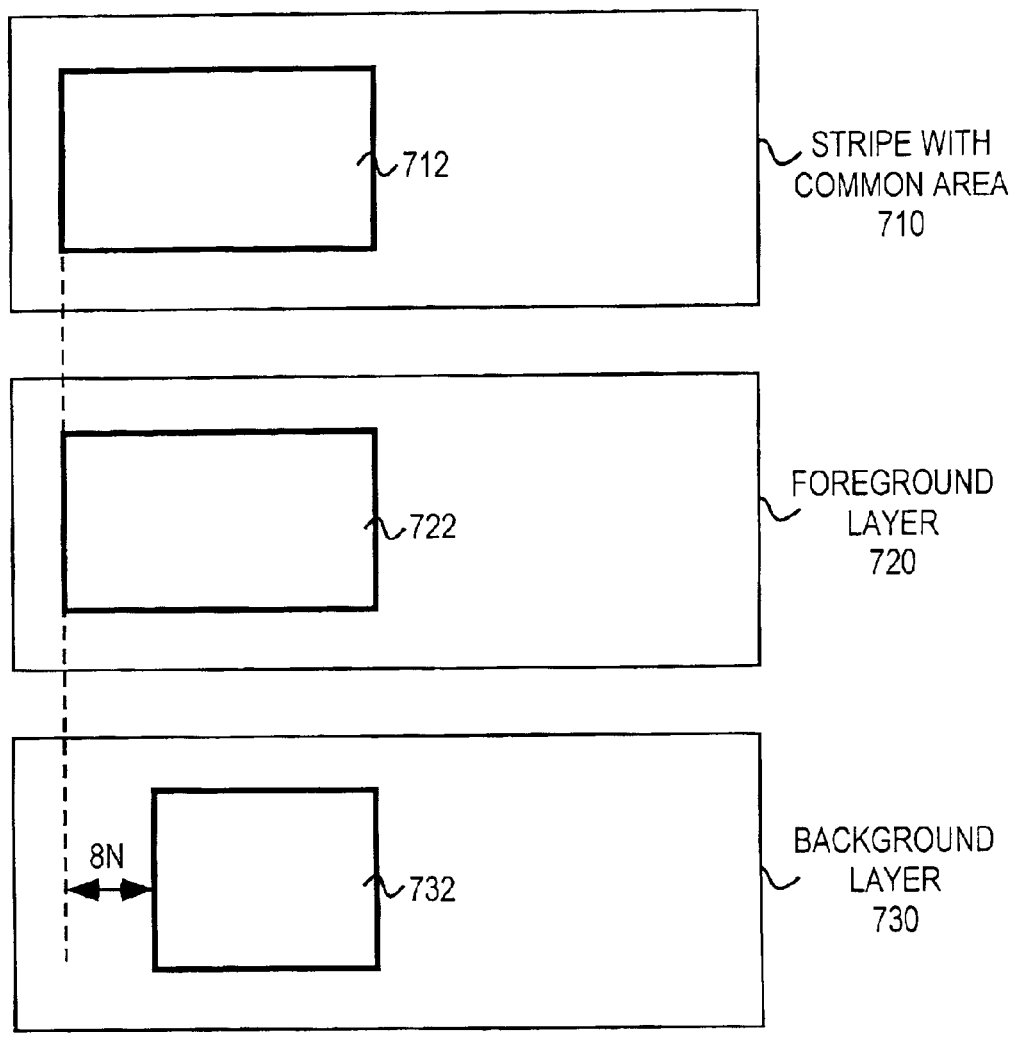
FIG. 7 illustrates a stripe with a common area decomposed into foreground and background layers after common area reduction.

FIG. 7 illustrates a stripe 710 with common area 712 before common area reduction. The stripe is decomposed into foreground layer 720 with reduced common area 722 and background layer 730 with reduced common area 732. The foreground reduced common area is the same as the common area 712 before reduction. The background reduced common area 732, however, is smaller in size indicating that common area reduction was successful for the background layer. Mask values have now been assigned to all areas except the intersection of the foreground and background common reduced areas. In the illustrated example, the intersection of the two is actually the background common area 732.

In one embodiment, the boundary of the reduced common area is adjusted to ensure that it facilitates efficient coder operation. For a JPEG-1 coder, the boundary of the reduced common area is adjusted to ensure that it is 8N pixels from the left edge of the common area 712 before reduction, wherein N is an integer (i.e., 0, 1, 2. . . . ). Thus the intersection of the two areas is designed to be a multiple of 8N pixels from the left edge of the area to be coded. In this case, the left edge of the background common reduced area is adjusted to ensure that it is a multiple of 8N pixels from the left edge of the foreground common reduced area. This adjustment is not necessary for JPEG 2000 encoding.

Referring to FIG. 4, after the stripe analysis block 430 has identified the base colors and offsets (step 440), a coder matched layer separation is performed (step 450) and then the interpolation (step 460) is performed. The layer separation and interpolation processes will be discussed first with respect to JPEG-1 and then JPEG 2000.

Figure 8:
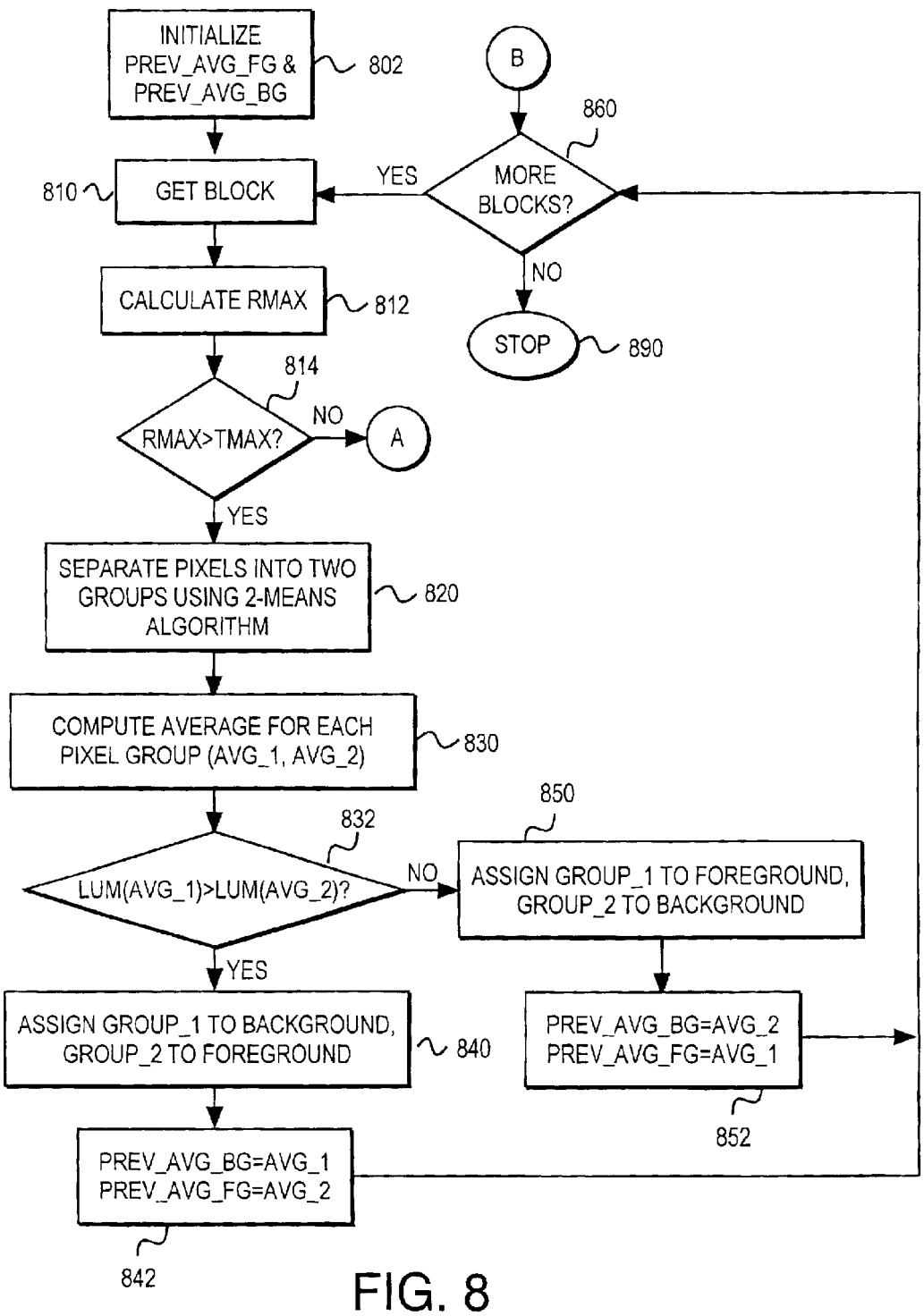
FIGS. 8–9 illustrate the coder matched layer separation process.
Figure 9:
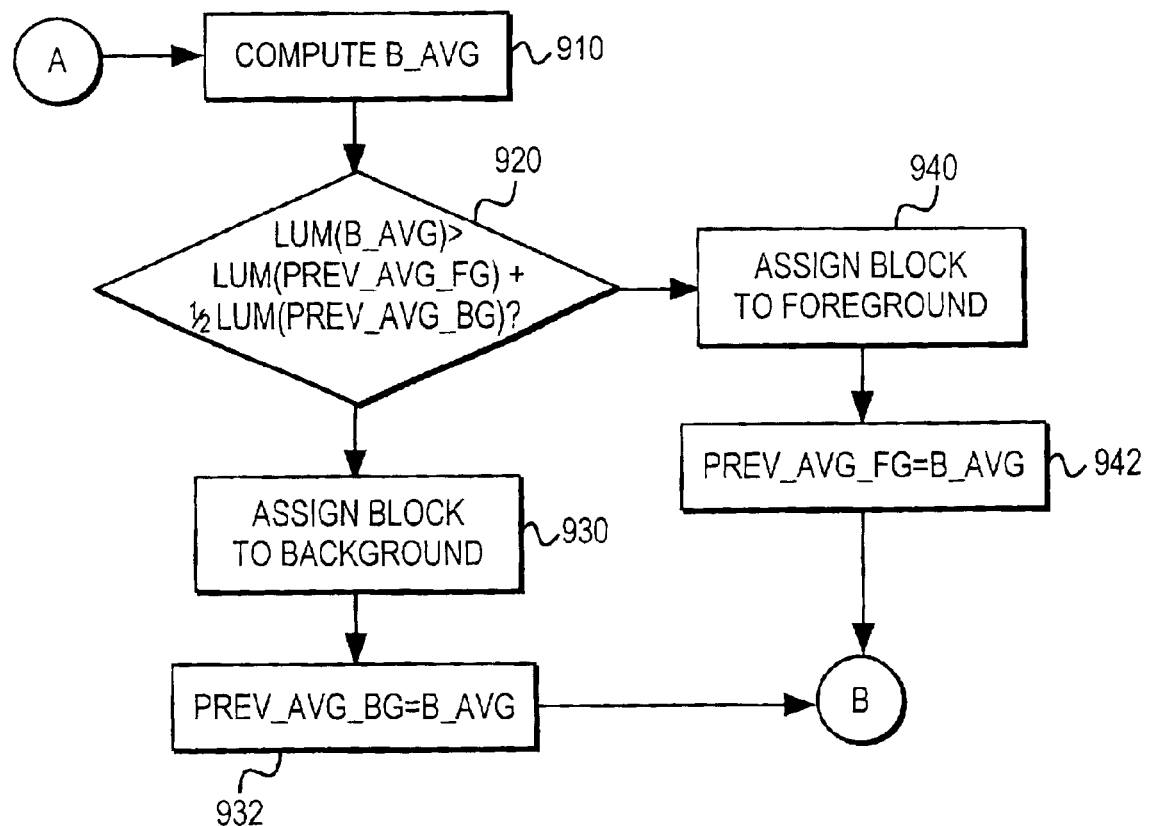

FIGS. 8–9 illustrate the coder matched layer separation process for JPEG-1. In one embodiment, the coder matched layer separation attempts to decompose the region of intersection into two separate layers that code more efficiently than the area of intersection itself.

Edges inside of JPEG coded blocks yield high coded rates. The coded rate is smaller, however, if the edges are moved to block boundaries. Thus high differentially coded DC values caused by jumps in DC values in successive blocks are more efficiently coded than high AC coefficients caused by edges inside the block.

Generally the coder matched layer separation processes blocks of pixels in the area of intersection in the coder scan order. Thus for JPEG type coders, the blocks are processed in row scan order. Within each block there are three possible layer combinations. Each block may consist of 1) pixels that belong exclusively to the foreground layer; 2) pixels that belong exclusively to the background layer; or 3) some pixels belonging to the foreground layer and other pixels belonging to the background layer.

If the block is of sufficiently low variance, it is assigned entirely to the foreground or background layer depending upon whether its pixels are closer to the DC value of the previous coded foreground block or the previous coded background block. For a high contrast block, the pixels are separated into two groups. In one embodiment, the lighter group is always assigned to the background layer while the darker color is assigned to the foreground layer. The mask values are assigned accordingly.

FIGS. 8–9 illustrate the coder matched layer separation process that is applied to the region of intersection or overlapped common reduced areas. Step 802 initializes the DC values for the interpolated foreground and background blocks. (Interpolation is discussed with respect to block 460.) The variables PREV_AVG_FG and PREV_AVG_BG are vectors representing the average values for each color plane of the previous interpolated coded foreground and background blocks, respectively. These vectors are initialized to the appropriate layer base colors in step 802.

In step 810 a block of pixels is selected from the region of intersection. In step 812, the value RMAX is calculated. For an image in RGB color space, RMAX is a scalar value corresponding to the maximum of the ranges of the R, G, and B components found in the selected block. If RMAX is greater than a pre-determined threshold, TMAX, as determined by step 814 (i.e., RMAX>TMAX), then some pixels will be assigned to the foreground and other pixels will be assigned to the background as determined by steps 820–852. Otherwise, if RMAX<TMAX then the entire block will be assigned to either the background or the foreground layer based on an average luminance value in the block as determined by steps 910–942 of FIG. 9.

If RMAX>TMAX, the pixels are separated into two groups. In one embodiment, a 2 means algorithm is used to separate the pixels into two groups, GROUP_1 and GROUP_2. The average for each group, AVG_1 and AVG_2 is then calculated in step 830. AVG_1 and AVG_2 are vectors whose elements represent the average pixel value of the associated color plane for GROUP_1 and GROUP_2, respectively.

The average luminances for the groups of pixels are compared in step 832. In one embodiment, the darker group is assigned to the foreground and the lighter group is assigned to the background.

Thus, if the average luminance of GROUP_1 is greater than the average luminance of GROUP_2 as determined by step 832, then GROUP_1 is assigned to the background and GROUP_2 is assigned to the foreground in step 840. The components of vector variable PREV_AVG_BG are assigned the average value for the associated color plane for the pixels in GROUP_1 (i.e., PREV_AVG_BG=AVG_1). Similarly, the components of vector variable PREV_AVG_FG are assigned the average value for the associated color plane of the pixels in GROUP_2 (i.e., PREV_AVG_FG=AVG_2).

Alternatively, if the average luminance of GROUP_1 is not greater than the average luminance of GROUP_2, then GROUP_1 is assigned to the foreground and GROUP_2 is assigned to the background in step 850. The variables PREV_AVG_BG and PREV_AVG_FG are respectively assigned the average value for the pixels in GROUP_2 and GROUP_1 (PREV_AVG_BG=AVG_2 and PREV_AVG_FG=AVG_1).

After the pixels have been assigned to the appropriate layer, step 860 determines if there are any blocks remaining to be processed. If so, the process continues with another block in step 810. Otherwise, the process is completed in step 890.

In the event RMAX<TMAX, then the block average, B_AVG, is computed in step 910 of FIG. 9 after step 814 of FIG. 8. The elements of vector B_AVG represent the average of each color plane of the image. The average block luminance is computed in step 920. Depending upon whether the average block luminance value is closer to the average luminance of the previous background or the previous foreground, the entire block is assigned to the background or foreground. Thus if the average luminance of the selected block is closer to the average luminance of the previous background, the block is assigned to the background in step 930 and the vector PREV_AVG_BG is set to B_AVG in step 932.

If, however, the average luminance of the selected block is closer to the average luminance of the previous foreground, the block is assigned to the foreground in step 940 and the vector PREV_AVG_FG is set to B_AVG in step 942.

Once the entire block has been assigned to either the foreground or the background layer, step 860 determines whether there are more blocks to process. If so, processing continues with step 810. If not, the process is completed in step 890.

Referring to FIG. 4, after the coder matched layer separation takes place in step 450, the layers are interpolated in step 460. The purpose of layer interpolation is to fill up the "holes" produced in the background and foreground layers when pixels are assigned to the other layer with values that result in efficient encoding. For each image layer 8×8 blocks are scanned in row-column order and interpolated to fill in the holes.

Although the value of these holes are irrelevant to the reconstruction of the image (they are masked out), the value assigned to the corresponding pixels may have significant impact on the block compression rate. Accordingly, the values of these "hole" or "don't care" pixels are modified in order to achieve greater compression efficiencies. This approach will not affect the reproduction quality and does not require modification of the decoding algorithm. The don't care pixels are alternatively referred to as "irrelevant" or "modifiable" pixels. The remaining pixels are referred to as "relevant" or "nonmodifiable" pixels.

As noted previously, each block of the stripe may consist of 1) pixels that belong exclusively to the foreground layer; 2) pixels that belong exclusively to the background layer; or 3) some pixels belonging to the foreground layer and other pixels belonging to the background layer. For a selected image layer, this implies that a block of the selected image layer may consist of 1) relevant pixels exclusively, 2) irrelevant pixels exclusively, or 3) a combination of relevant and irrelevant pixels.

Figure 10:
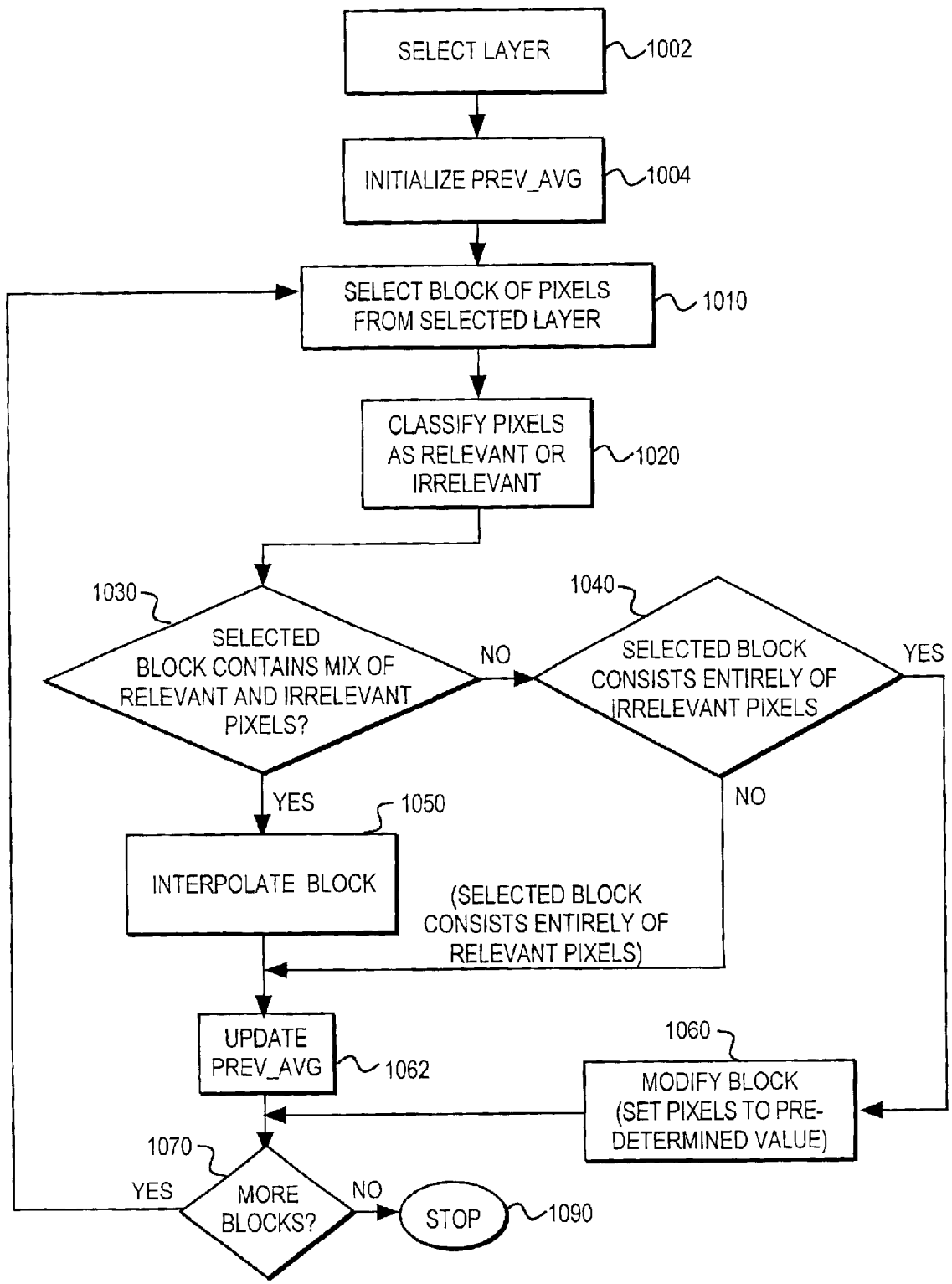
FIG. 10 illustrates the selection of blocks for pixel interpolation or modification.

FIG. 10 illustrates how blocks of a selected image layer of a stripe are selected for interpolation. An image layer is selected in step 1002 from the set {foreground, background}. A variable PREV_AVG is initialized to either the background or foreground base color in step 1004 depending upon the corresponding selected layer. A block of pixels for the selected layer is selected in step 1010. The pixels are classified as relevant or irrelevant in step 1020. The mask layer inherently classifies pixels as relevant or irrelevant for a given image layer.

If the selected block contains a mix of relevant and irrelevant pixels as determined by step 1030, then the block is interpolated as indicated by step 1050. If the selected block consists entirely of irrelevant pixels as determined by step 1040, then the pixel values are set to a pre-determined value in step 1060. In one embodiment, the pre-determined value is PREV_AVG which is initially set to the foreground or background color depending upon the associated layer being processed. If the block otherwise consists entirely of relevant pixels, then no interpolation is performed.

After steps 1050 or 1040, the PREV_AVG is updated with the average values of the relevant pixels in the selected block in step 1062. No update is required if the selected block initially consisted entirely of irrelevant pixels. After PREV_AVG has been updated, if necessary, step 1070 determines if the selected layer has additional blocks to be processed. If so, the process returns to step 1010 to repeat itself with a new block.

In one embodiment the interpolation of step 1050 assigns the irrelevant pixels the average value of the relevant pixels in the selected block. This interpolation procedure tends to be considerably faster than the subsequently discussed interpolation procedure, but may not achieve the same rate of compression.

In an alternative embodiment, the interpolation process of step 1050 is considerably more complex but frequently results in greater compression rate than the simpler and faster averaging process. In order to understand this alternative interpolation process some understanding of the coder process is required.

Block compression algorithms are prevalent in image processing applications. One technique for compressing the digital representation of source image data includes the step of transforming the spatial domain image data into frequency domain data. Transformation from the spatial domain into the frequency domain is also referred to as a forward transformation.

Forward transformation is analogous to a harmonic analysis of the source image. A forward transform is used to represent the spatial image data as linear combinations of basis functions. The coefficients for these basis functions are determined during the transformation process.

The basis coefficients are then quantized or thresholded to eliminate contributions from the corresponding basis function to achieve some level of compression. The remaining coefficients are then re-ordered or run-length encoded or otherwise processed to facilitate further compression of the image data. The resulting compressed image data is then available for storing, distribution, or for further processing.

Typically, the greater the number of zero-valued quantized coefficients, the greater the rate of compression. Accordingly, the values of the irrelevant pixels may be modified to decrease the number of non-zero quantized coefficients. The modifiable pixels are modified so that a quantized forward transform of the modified block has a greater number of zero values than a quantized forward transform of the selected block. This operation reduces the "rate" of the compressed image, where "rate" is a reference to the storage requirements of the compressed image. The operation thus increases the compression efficiency or rate efficiency of the image encoder.

The manner in which pixels are modified depends upon the specifics of the compression algorithm. The Joint Photographic Experts Group and the Motion Picture Experts Group (MPEG) have each promoted popular image compression and encoding architectures that manipulate spectral content to achieve data compression. JPEG-1 compression is frequently used for static images such as those encountered in facsimile or standard printing applications. The MPEG format is used for dynamic images or movies. The basic process has been promulgated by JPEG and is in widespread use today. Although JPEG-1 utilizes a Discrete Cosine Transformation (DCT), specific implementations of the forward transform, quantization, and entropy encoding blocks is left to the implementer.

Figure 11:
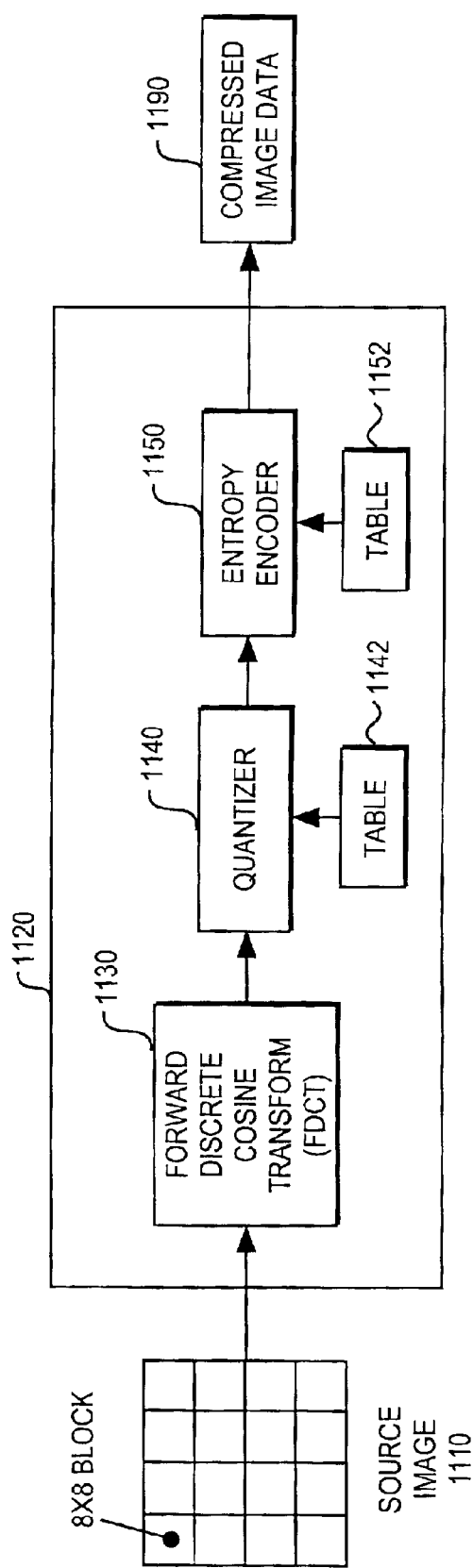
FIG. 11 illustrates one embodiment of a block oriented compression process.

FIG. 11 illustrates one embodiment of a block-based process for compressing an image in greater detail. The image encoder 1120 processes a discretized source image 1110 to produce compressed image data 1190.

Encoder 1120 processes the source image 1110 as a plurality of 8×8 source blocks. A forward transformation is performed on each 8×8 source block. Each 8×8 source block is a 64-point discrete signal that is a two-dimensional spatial function of x and y. The DCT is one of many transforms that can be used to represent signals as linear combinations of basis functions. Although the DCT is the selected transform for JPEG-1 compression, other linear forward transforms such as the Fourier transform and the Discrete Sine Transform (DST) may be used.

The forward DCT is a harmonic analyzer that converts the 64 point discrete signal into 64 orthogonal basis signals. Each orthogonal basis signal represents a two dimensional spatial frequency forming the spectrum of the 8×8 source block. The output of the forward DCT is a coefficient block identifying the amplitude of each of these orthogonal basis signals. The amplitudes are referred to as DCT coefficients and the values are determined by the discrete 64 point input signal.

Referring again to FIG. 11, quantizer 1140 quantizes the DCT coefficients in accordance with a quantization table 342. Different quantums can be used with different spatial frequencies as identified by quantization table 1142. The quantized c(u,v) may be calculated as follows:

$$c^Q(u,v) = INT\left(\frac{c(u,v)}{q(u,v)}\right)$$

where "INT" is an integer function to ensure the result is an integer.

The quantization table permits different step sizes for different basis functions. The quantization table is thus a 64 element table, one element for each spatial frequency. Generally, step sizes for higher frequency basis functions are larger than the step sizes for lower frequency basis functions. The step sizes are typically chosen at the perceptual threshold for the visual contribution of the corresponding cosine basis function. The perceptual threshold are functions of the source image characteristics, display characteristics, viewing distance, etc. Thus the choice of quantization table may be application dependent.

After quantization, entropy encoding is used to efficiently represent the quantized coefficients. Entropy encoder 1150 uses entropy encoding table 1152 to generate the compressed image data 1190.

Briefly, the number of previous zeros and the bits needed to represent the current quantized coefficient value form a pair. Each pair has its own code word assigned through a variable length code. Huffman, Shannon-Fano, and arithmetic coding are examples of commonly used variable length coders. The more often a given element occurs, the smaller the number of bits that are used for the corresponding code. The JPEG-1 encoder outputs the code word for the pair and then a code word for the current quantized coefficient (also assigned by a variable length coder).

After processing a block of quantized DCT coefficients, the JPEG-1 encoder writes a unique end of block sequence and then moves to the next block. After finishing all blocks, the JPEG-1 encoder writes an end-of-file marker. Tables 1152 and 1142 may be incorporated into the compressed image data to facilitate reconstruction.

Figure 12:
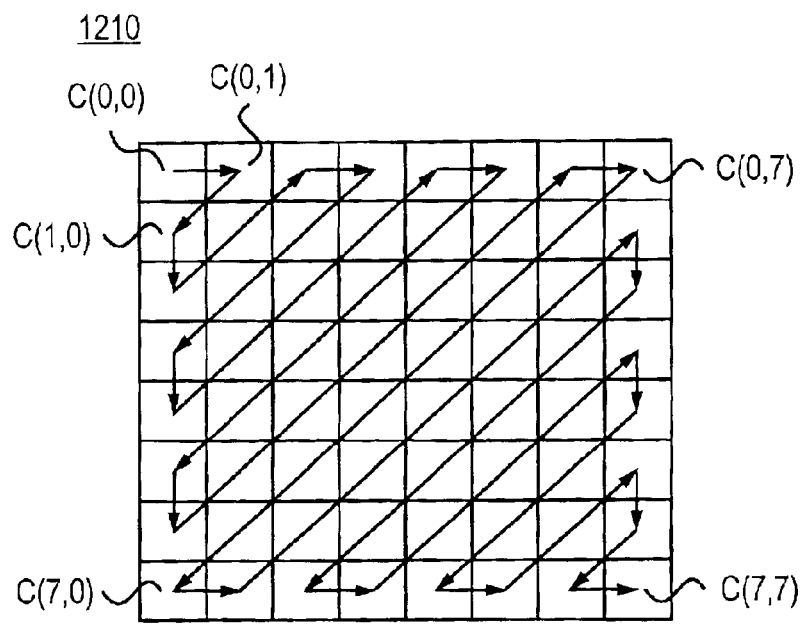
FIG. 12 illustrate a zig-zag processing order for entropy encoding coefficients.

The result of quantization is that many of the DCT coefficients have been reduced to zero. In particular, coefficients corresponding to higher frequency cosine basis functions tend to be zero. Ordering quantized DCT coefficients to obtain longer strings of zero-valued elements improves the rate efficiency of the entropy encoder, particular at the point where any remaining quantized DCT coefficients to be encoded are all zero. Accordingly, the entropy encoder encodes the quantized DCT coefficient block in a zig-zag manner progressing from quantized coefficients associated with lower frequency basis functions to the quantized coefficients associated with higher frequency basis functions as illustrated in FIG. 12.

The upper left corner of block 1210 corresponds to the DC term (u, θ=0). The DC terms are differentially encoded across individual encoded blocks. The remaining AC terms represent higher frequency cosine basis functions when progressing towards the lower right corner. The JPEG-1 entropy encoder need only encode up to the highest frequency non-zero quantized coefficient before writing an end of block. Any other coefficients are presumed to be zero.

The zig-zag scan order tends to group the number of non-zero elements at one end of the string of elements to be encoded. When the higher frequency basis coefficients are zero, the zig-zag scan order groups the zero elements at the end of the string of quantized coefficients being coded, thus improving the rate efficiency of the entropy encoder. The JPEG-1 encoder need not encode beyond the last non-zero quantized coefficient in the scan order. Given that the higher order frequencies are likely to be zero, the zig-zag scan order thus increases the compression efficiency of the JPEG-1 encoder.

The basic spectral manipulation encoding process can be modified to permit modification of pixel values that are irrelevant to reconstruction of the source image, but might have significant effects on rate efficiency.

The 64 pixels in a block are denoted as vector $\underline{z}$ which is comprised of two smaller vectors $\underline{y}$ and $\underline{x}$ such that $$\underline{z}^T = \{\underline{y}^T, \underline{x}^T\}$$

where $\underline{y}$ is the set of $N_y$ relevant pixels and $\underline{x}$ is the set of $64-N_y$ irrelevant pixels. The 64×64 2D DCT transformation matrix for the vector is denoted T so that the coefficient set $\underline{c}$ is given by $\underline{c} = T\underline{z}$.

One approach might be to solve for the vector $\underline{x}$ in $\underline{z}$ that minimizes the energy of the AC coefficients while leaving the known vector $\underline{y}$ unaffected. The cost function to be minimized is then given by $$J(\underline{x}) = \sum_{i=1}^{63} c_i^2$$

$$= \|c\|^2 - c_0^2$$

$$= \|z\|^2 - c_0^2$$

$$= \|x\|^2 + \|y\|^2 - c_0^2$$

$$= \sum_{i=0}^{63-N_y} x_i^2 + \|y\|^2 - c_0^2$$

The DC coefficient for 2D DCT is given by:

$$c_0 = \frac{1}{8}\sum_{i=0}^{63} z_i$$

$$= \frac{1}{8}\sum_{i=0}^{N_y-1} y_i + \frac{1}{8}\sum_{i=0}^{63-N_y} x_i$$

When $J(\underline{x})$ is partially derived with respect to each element $x_i$ of $\underline{x}$ and equated to zero, each element is found to yield the same optimal value given by:

$$x_i = \frac{1}{N_y}\sum_{i=0}^{N_y-1} y_i$$

Thus the optimal interpolation for the modifiable pixels in terms of minimizing energy of AC coefficients is the solution that sets the values of all the modifiable pixels to the average of the nonmodifiable pixels. This approach might be a good starting point but it ignores the effects of differential DC coding and the particulars of the block compression algorithm entropy encoder.

The goal is to find $\underline{z}$ that minimizes the rate by maximizing zero runs along the reverse zig-zag scanning path while satisfying other constraints. For example, any modifiable $z_i$ must be assigned a pixel value within the realizable range and $z_i$ for nonmodifiable pixels should not change giving:

$$z_i = y_i \ i = \{0, 1, \ldots, N_y - 1\}$$

$$0 \leq z_i \leq 255 \ i = \{N_y, \ldots, 63\}$$

Consider the DCT coefficients for the modified block. Some coefficients are quantized to zero while others are quantized to non-zero values. The locations (i.e., indices) of the coefficients that can be quantized to zero form the set $I_{zero}$ such that $$I_{zero} = \left\lfloor i \left| -\frac{q_i}{2} < c_i < \frac{q_i}{2}; i \in \{0, 1, \ldots, 63\} \right. \right\rfloor$$

The coefficients are scanned in reverse zig-zag scan order to find the first one, $c_j$, that is not quantized to zero. If it is possible to "push" the coefficient to zero without violating the other constraints then there is a solution z which satisfies the previous constraints:

$$z_i = y_i \ i = \{0, 1, \ldots, N_y - 1\}$$

$$0 \leq z_i \leq 255 \ i = \{N_y, \ldots, 63\}$$

as well as the following constraint obtained from the $I_{zero}$ set:

$$-\frac{q_i}{2} < c_i = t_i^T z < \frac{q_i}{2}, \ i \in I_{zero},$$

(i.e., no zero-quantized coefficient may become non-zero quantized that also satisfies the following constraint:

$$-\frac{q_j}{2} < c_j = t_j^T z < \frac{q_j}{2}$$

The term $t_i$ represents the $i^{th}$ row of DCT matrix T. Each zero quantization constraint is a linear inequality constraint. The existence of a feasible solution is a Phase 1 linear programming problem which can be readily solved using techniques such as the simplex method. Modification of coefficient values will not affect the value of relevant pixels as a result of the equality constraints limiting such modifications. Relevant pixels in the selected block will have the same value as corresponding pixels in an inverse transform of the modified coefficient block. The inverse transform of the modified coefficient block is a modified selected block.

If a solution exists, then the index of the new zero quantized coefficient is added to the $I_{zero}$ set and $\underline{z}$ is updated to the feasible solution. If, $c_j$ is not zero quantizable, then the method proceeds to the next non-zero coefficient proceeding in the reverse zig zag order. The process may be repeated until all non-zero quantized coefficients have been tested.

Although the resulting solution satisfies all the constraints, the solution may not be optimal in the sense of minimizing the energy of the coefficients. In addition to maximizing the length or number of zero runs, the energy of the non-zero quantized coefficients should be minimized to reach the lowest rate. The minimum energy solution at each stage minimizes:

$$E(\underline{z}) = \left( c_0 - \frac{8}{N_y} \sum_{i=0}^{N_y-1} y_i \right)^2 + \sum_{i=1}^{63} c_i^2$$

subject to the previously established constraints:

$$-\frac{q_i}{2} < c_i = t_i^T \underline{z} < \frac{q_i}{2}, \ i \in I_{zero}$$

$$z_i = y_i \ i = \{0, 1, \ldots, N^y - 1\}$$

$$0 \leq z_i \leq 255 \ i = \{N_y, \ldots, 63\}$$

The dc value is considered differentially with respect to the mean of the relevant pixel values. The above problem is a quadratic cost function subject to a series of linear equality and inequality constraints. A quadratic program may be applied to identify a solution. The quadratic solver needs only to be invoked after the successive Phase 1 linear programs.

The successive linear programs yield solutions with increasing numbers of zero quantized coefficients which may result in the energy of the remaining DCT coefficients becoming higher than that of the optimal average interpolated block. If the energy increases too much, the rate may increase even if zero runs have been maximized.

To avoid this outcome, the quadratic program may be invoked at each stage after a feasible solution has been found. In this case, the quadratic program uses a stopping criterion based on the ratio of the coefficient energies of the newest modified block versus that of the average interpolated block. If the energy E of the modified selected block exceeds a pre-determined proportion $T_E (T_E > 1)$ of the energy $E_0$ of the average interpolated block then the optimization is terminated to avoid leading to a higher rate.

Figure 13:
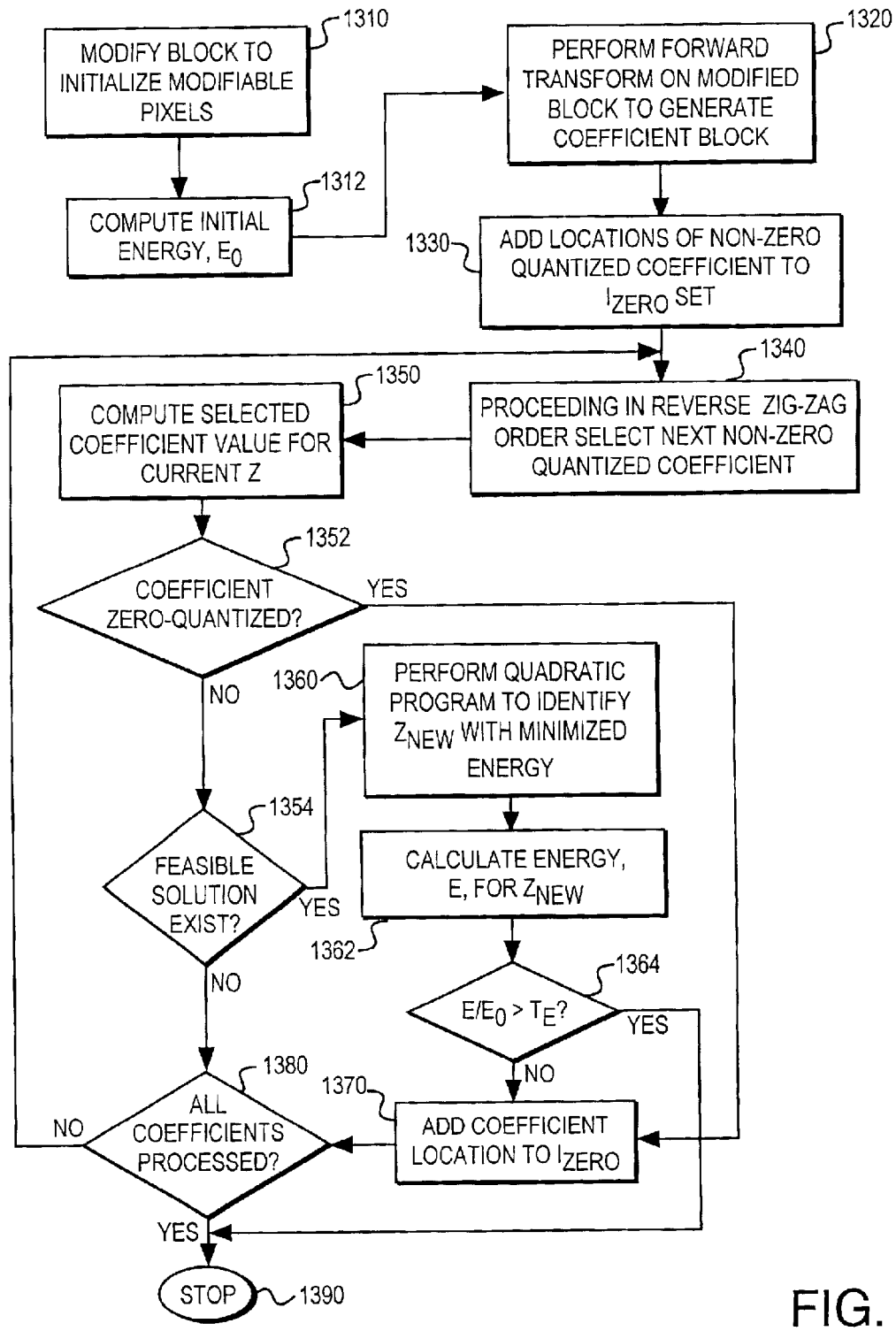
FIG. 13 illustrates a method of modifying the spectral content of a selected block of pixels subject to a plurality of constaints.

FIG. 13 illustrates the pre-compression optimization process for blocks having a mix of relevant and irrelevant pixels. The irrelevant pixels are initialized in step 1310. In one embodiment, the irrelevant pixels are set to a value corresponding to the average pixel value of the relevant pixels in the selected block. In step 1312, the energy of the selected block (after initialization) is computed as $E_0$.

In step 1320, a coefficient block is generated by applying a forward transform on the selected block. In step 1330, the location of all zero quantized coefficients is stored in array $I_{zero}$.

Proceeding in the reverse zig-zag order, the location of a selected non-zero quantized coefficient is identified in step 1340. In step 1350, the value of the selected coefficient is calculated for the current $\underline{z}$.

Step 1352 determines whether the selected coefficient is zero quantized. If so, then the location of the coefficient is appended to the $I_{zero}$ set of other zero quantized coefficients in step 1370.

If the selected coefficient is not zero quantized, then step 1354 determines whether a feasible solution exists that results in a zero quantized coefficient subject to the previously identified constraints. In one embodiment, a Phase 1 linear program is used to identify such a feasible solution. In one embodiment, the simplex method is used to identify feasible solutions. If no feasible solution exists, processing continues to step 1380.

If a feasible solution exists, a quadratic program is used to identify the minimal energy solution for $\underline{z}$ in step 1360. This new $\underline{z}$ has an associated energy, E, which is calculated in step 1362.

Step 1364 determines whether $$\frac{E}{E_0} > T_E,$$

where $T_E$ is an acceptable threshold value for the proportion of E to $E_0$. If $$\frac{E}{E_0} \leq T_E$$

then the coefficient location is added to the $I_{zero}$ set of other zero quantized coefficients in step 1370 and processing continues with step 1380.

Proceeding from either step 1354 or step 1370, a check is performed in step 1380 to determine whether there are any more coefficients to be processed. If not, then the modification process for the coefficient block is completed in step 1390. Otherwise, the process continues with the next non-zero quantized coefficient by returning to step 1340.

The optimization process repeats steps 1340–1380 until all non-zero quantized coefficients have been processed or until the energy of the result exceeds the pre-determined threshold.

In one embodiment, the process stops the first time a feasible solution cannot be found regardless of whether additional coefficients remain to be processed. This approach maximizes the length of the last run on zeroes. The last run has the most significant effect on coded rate for JPEG-1 encoders due to the principle of operation of the entropy encoder.

The method of spectral content manipulation tends 1) to increase the number of zero quantized coefficients, and 2) to prioritize increasing the number of consecutive zero quantized coefficients associated with higher frequency basis functions. Given the idiosyncrasies of entropy encoders, this enables the JPEG-1 encoder to represent the relevant image using less data before issuing an end of block.

Referring back again to FIG. 4, once the layer interpolation has been performed, the background, foreground, and mask layer coding is performed in step 470. In one embodiment, the foreground and background layers are JPEG-1 coded (see FIG. 11) and the mask layer is JBIG coded.

Figure 14:
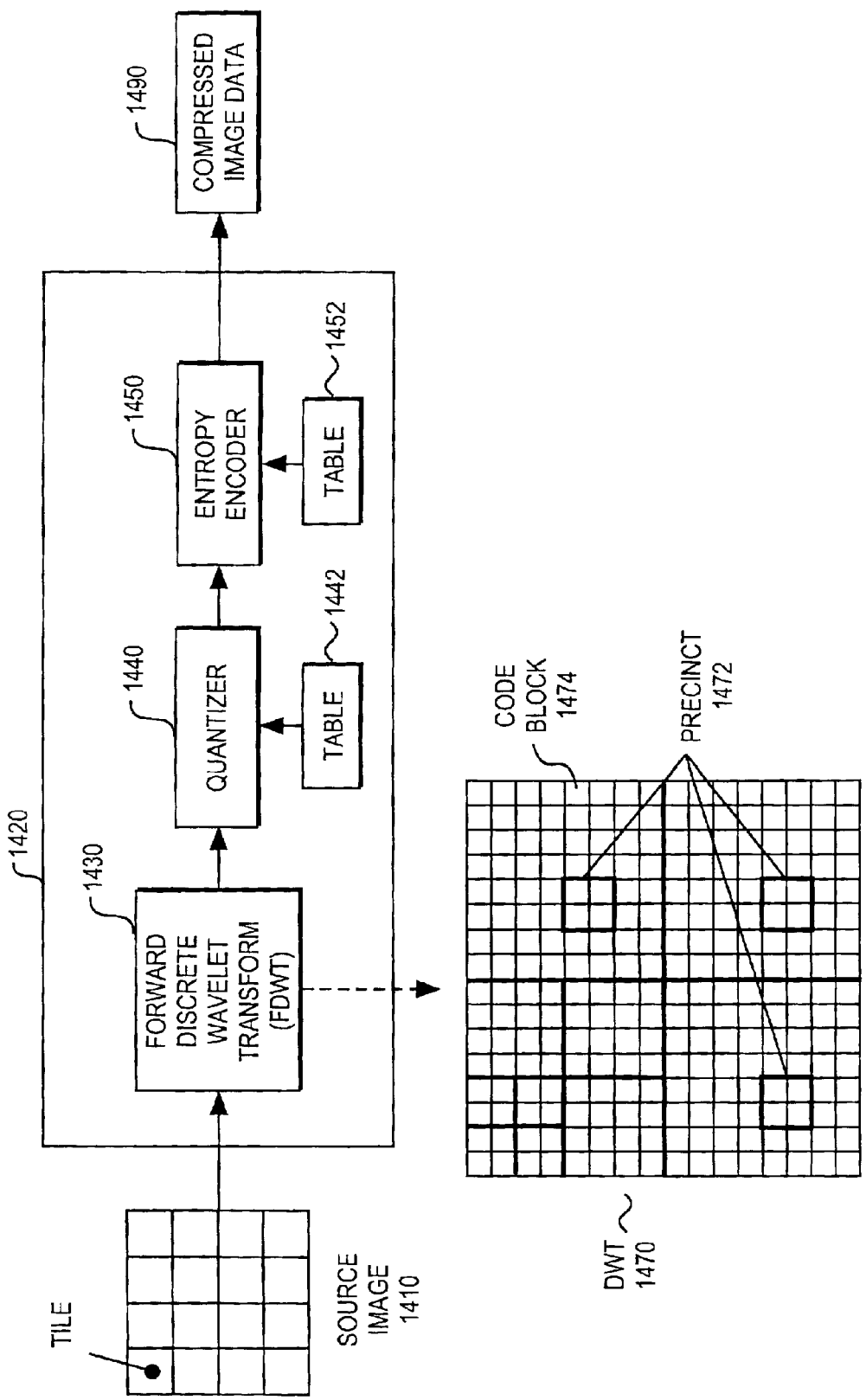
FIG. 14 illustrates a wavelet transform based image compression process.

JPEG 2000 is based on a discrete wavelet transform (DWT) rather than the DCT transformations of JPEG-1. FIG. 14 illustrates the basic process for JPEG 2000 coders.

The source image 1410 is provided to JPEG 2000 encoder 1420. Unlike JPEG-1, JPEG 2000 is not a block encoder. Although the image may be tiled, the tile sizes may be uniformly selected to be any size including a tile the size of the entire image. If the image is tiled, the process is performed on each tile. Otherwise, the JPEG 2000 coder is applied to the entire image as a single large tile.

As with JPEG-1, a forward transform is performed. In this case, the forward transform is a discrete wavelet transform 1430. Each tile is decomposed into different decomposition levels. The decomposition levels contain a number of subbands that consist of coefficients that describe the horizontal and vertical spatial frequency characteristics of the source tile. Power of 2 dyadic decompositions (e.g., 1470) are typical. JPEG 2000 permits decompression at different resolutions.

In one embodiment, the forward DWT is performed using a one dimensional subband decomposition of a one dimensional set of samples into low pass and high pass samples. In one embodiment this is achieved using a Daubechies 9-tap/7-tap filter (irreversible, used for lossy coding). In an alternative embodiment a 5-tap/3-tap filter is used. The 5/3 filter is reversible and permits either lossy or lossless encoding.

After the forward DWT, the transformed tile is quantized by quantizer 1440. An entropy encoder 1450 then encodes the quantized tile to generate the compressed image data 1490. In one embodiment, the entropy encoder uses arithmetic coding.

The entropy encoder divides each subband of the quantized tile into rectangular blocks. Three spatially consistent rectangles (one from each subband at each resolution level) form a precinct 1472. Each precinct is further divided into non-overlapping code blocks 1474 for entropy encoding. Generally, the compression rate achieved by a JPEG 2000 coder improves when the image is "smooth".

Figure 15:
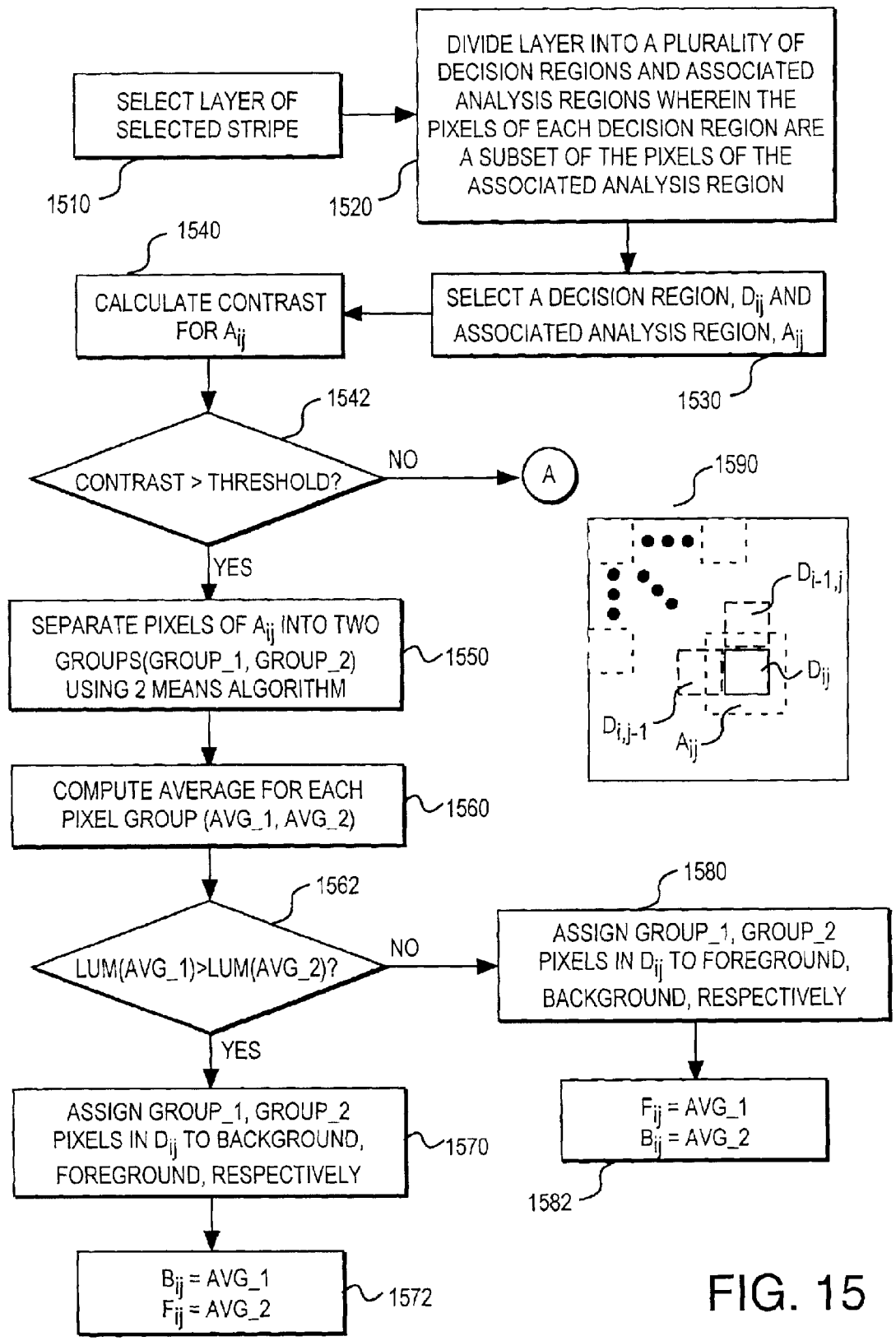
FIGS. 15–16 illustrates a coder matched layer separation process for wavelet transform based image compression.

Referring back to FIG. 4, layer separation (step 450) for JPEG 2000 based encoding is illustrated in FIG. 15. A layer of the selected stripe is selected in step 1510. The layer is divided into a plurality of decision regions and associated analysis regions. The pixels of each decision region are a subset of the pixels of the associated analysis region (i.e., $D_{ij} \subseteq A_{ij}$). A decision region, $D_{ij}$, and associated analysis region, $A_{ij}$, are selected in step 1530. Each $D_{ij}$ also has an associated foreground ($F_{ij}$) and background ($B_{ij}$) average. Element 1590 illustrates the relationship between the regions.

Figure 16:
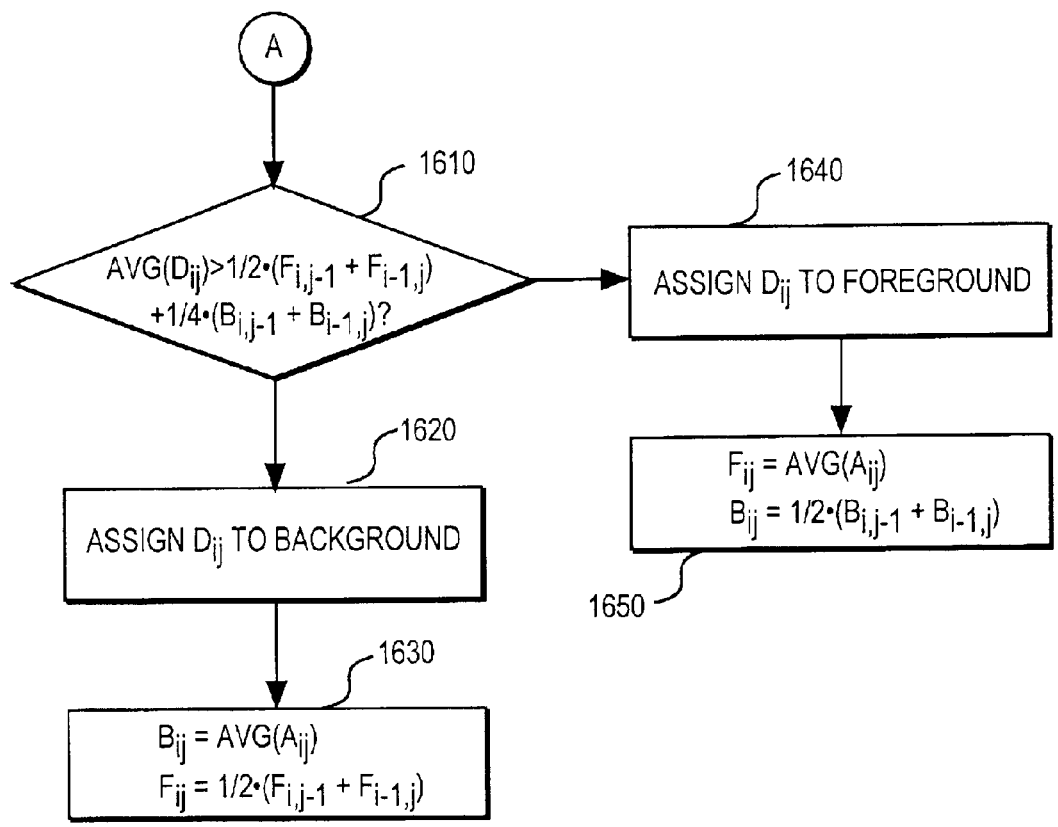

The contrast of $A_{ij}$ is calculated in step 1540. If there is little variance in the area of analysis, then all pixels within $D_{ij}$ will be assigned to either the foreground or the background layer depending upon whether the average value is closer to the background color or the foreground color. For example, if the contrast does not exceed a pre-determined threshold in step 1542, processing continues with step 1610 of FIG. 16.

Step 1610 determines if the average of $D_{ij}$ is closer to the foreground or background colors. In particular, if $$AVG(D_{ij}) > \left(\frac{F_{i,j-1} + F_{i-1,j}}{2}\right) + \frac{1}{2}\left(\frac{B_{i,j-1} + B_{i-1,j}}{2}\right),$$

then all the pixels of $D_{ij}$ are assigned to the background layer in step 1620. The background average, $B_{ij}$, is set to AVG($A_{ij}$). The foreground average, $F_{ij}$, is set to $$F_{ij} = \frac{F_{i,j-1} + F_{i-1,j}}{2}.$$

in the alternative, all the pixels of $D_{ij}$ are assigned to the foreground in step 1640. The associated foreground average, $F_{ij}$, is set to AVG($D_{ij}$). $B_{ij}$ is set to the average of neighboring code blocks in step 1650

$$\left(B_{ij} = \frac{B_{i,j-1} + B_{i-1,j}}{2}\right).$$

Referring back to step 1542, if the contrast exceeds a pre-determined threshold, some pixels will be assigned to the foreground and some to the background. The pixels are arranged into two groups (GROUP_1, GROUP_2) using a 2 means algorithm in step 1550. The average (AVG_1, AVG_2) is computed for each pixel group in step 1560.

Step 1562 determines if GROUP_1 is generally lighter than GROUP_2. The luminance of the averages are calculated for this purpose. If only a single bitplane is used, the averages alone may be compared.

If LUM(AVG_1)>LUM(AVG_2), the pixels of GROUP 1 in $D_{ij}$ are assigned to the background and the pixels of GROUP_2 in $D_{ij}$ are assigned to the foreground in step 1570. The background average for the current block is set to AVG_1 and the foreground average is set to AVG_2 in step 1572.

If GROUP_1 is darker than GROUP_2, then the GROUP_1 pixels in $D_{ij}$ are assigned to the foreground and the GROUP_2 pixels in $D_{ij}$ are assigned to the background in step 1580. The foreground average, $F_{ij}$, is set to AVG_1 and the background average, $B_{ij}$, is set to AVG_2. The mask is updated accordingly.

Figure 17:
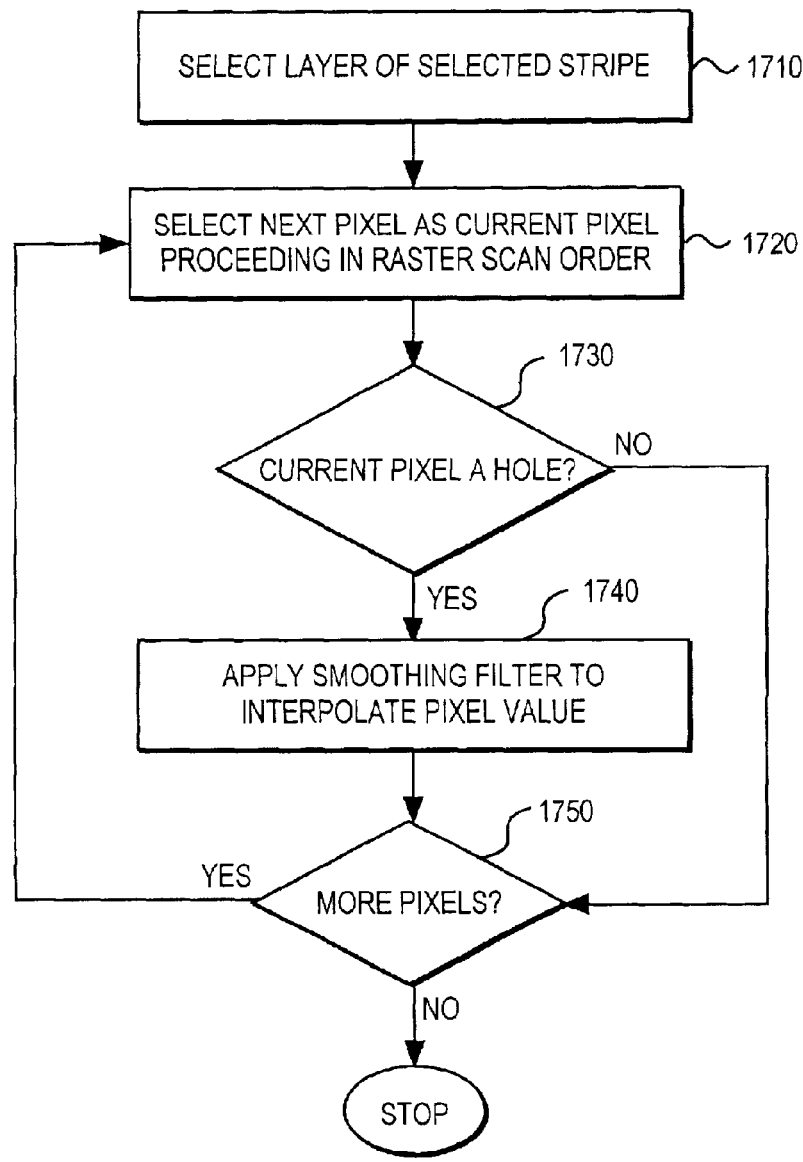
FIG. 17 illustrates a method of interpolating irrelevant pixels for wavelet transform based image compression.

Referring again to FIG. 4, once layer separate has been achieved (step 450), layer interpolation is performed in step 460 as illustrated by FIG. 17. Due to the use of wavelet transforms, smoothness of the image tends to result in more compact encoding.

A layer of the selected stripe is selected in step 1710. Step 1720 selects the next pixel as the current pixel proceeding in a raster scan order. If step 1730 determines that the current pixel is a hole, step 1740 applies a smoothing filter to interpolate a value for the current pixel. The process continues until all the pixels of the selected layer have been analyzed (step 1750).

Figure 18:
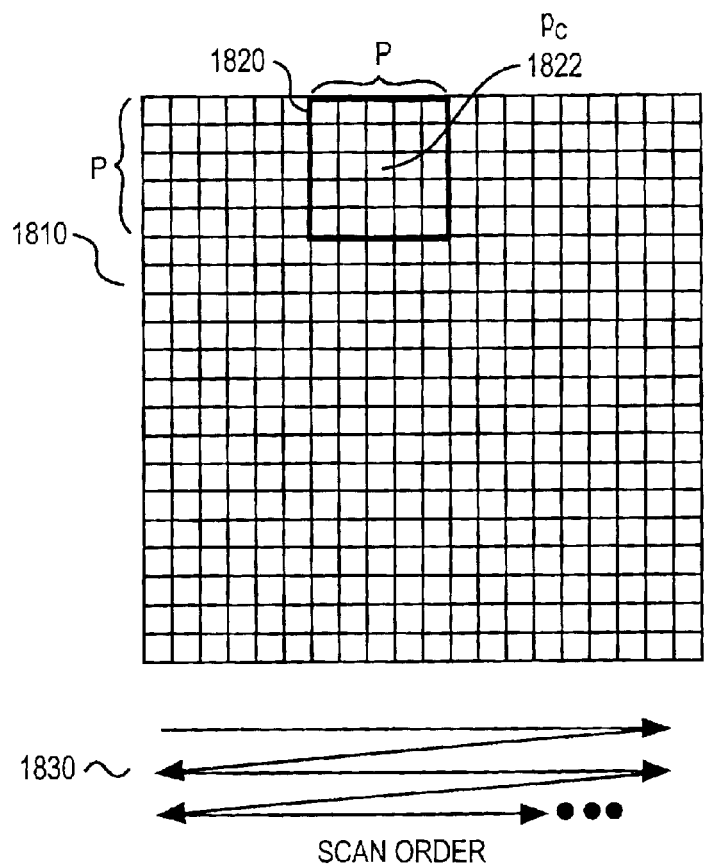
FIG. 18 illustrates interpolation of irrelevant pixels at the center of a smoothing filter progressing across the image in a raster scan order.

FIG. 18 illustrates one embodiment of a smoothing process for interpolating hole pixel values for a given source image layer 1810. A P×P sampling window 1820 centered on the current pixel ($p_c$ 1822) is used to interpolate the current pixel 1822. In various embodiments, P=5 or P=7. A filter 1890 consists of a plurality of elements $V_{kl}$. In one embodiment, filter 1890 is a Gaussian filter. The filtering process provides a weighted normalized average for the subject pixels within the window. The weighting of the pixels depends upon whether the subject pixels are "causal" or "non-causal" and whether the associated pixels are holes (i.e., irrelevant) or not (relevant). Thus the weighting depends on causality and relevance of the subject pixels.

A causal pixel is any pixel which has already been traversed by the filter proceeding in raster scan order. Non-causal pixels have not yet been traversed (i.e., they have not yet been the center pixel for the filter window as the window traverses the selected image layer). Non-causal irrelevant pixels are not considered for any calculations. Relevant pixels and causal, irrelevant pixels may be used for interpolating a value for $p_c$.

In one embodiment, the value for the center pixel ($p_c$) is calculated as follows:

$$p_c = \frac{1}{W} \sum_{k,l=1\cdot P} p_{kl} w_{kl} V_{kl}, \text{ where}$$

$$W = \sum_{k,l=1 P} w_{kl} V_{kl}$$

$$w_{kl} = \begin{cases} 0 & \text{for the center pixel and non-causal irrelevant pixels} \\ m_1 & \text{for relevant pixels} \\ m_2 & \text{for causal irrelevant pixels} \end{cases}$$

Irrelevant pixels within INT(P/2) rows or columns of the edge of the image cannot utilize the full filter window (where INT is the integer function). For these cases, the window is truncated appropriately.

When proceeding in the raster scan order from the beginning, clearly the process above cannot commence until at least one relevant pixel is within the filter window. The filter is moved in the raster scan order until such a condition occurs at pixel Y. Once the calculations are performed for pixel Y, any preceding irrelevant pixels in the scan order are assigned the same value as was calculated for pixel Y. The process then continues from point Y forward as described above.

In one embodiment, $m_1$ and $m_2$ are selected to weight relevant pixels more heavily than causal irrelevant pixels such that $$\frac{m_1}{m_2} > 1.$$

In one embodiment, $m_1=2$ and $m_2=1$ to weight the relevant pixels twice as heavily as the causal irrelevant pixels. This smoothing process conditions the irrelevant pixels so that the layer may be more efficiently compressed with a compression process using a wavelet forward transform.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of decomposing an image comprising the steps of:
    a) decomposing the image into a plurality of stripes;
    b) decomposing each stripe into foreground and background image layers, and a mask layer; and
    c) applying a smoothing filter to interpolate irrelevant pixel values in the foreground and background layers for wavelet encoding efficiency,
    wherein step c) further comprises the steps of:
        i) determining a layer base color and offsets to a common reduced area of each layer to identify image and mask layer values for all regions except an overlapped common reduced area; and
        ii) separating the overlapped common reduced area into foreground and background layers.

2. The method of claim 1 further comprising the step of:
    d) encoding the foreground, background, and mask layers with a forward discrete wavelet transformation encoder.

3. The method of claim 2 wherein the foreground and background are JPEG 2000 encoded, wherein the mask is encoded with one of a JBIG and a JBIG2 encoder.

4. The method of claim 1 wherein step c) further comprises the steps:
    iii) classifying each pixel within a selected layer as relevant or irrelevant; and
    iv) applying a smoothing filter to each irrelevant pixel, $p_c$, proceeding in a raster scan order to interpolate a value for that irrelevant pixel.

5. The method of claim 4 wherein a normalized weighted average of the relevant pixels and causal irrelevant pixels contribute to the interpolated value.

6. The method of claim 4 wherein the smoothing filter is a weighted Gaussian filter.

7. The method of claim 6 wherein each element of the smoothing filter is of the form $w_{kl} V_{kb}$, wherein $V_{kl}$ is a non-weighted filter value, wherein $W_{kl}$ is a function of its associated pixel causality and relevance.

8. The method of claim 7 wherein $w_{kl}=0$ for the center pixel ($p_c$) and any non-causal irrelevant pixel.

9. The method of claim 7, wherein $w_{kl}$ is set to $m_1$ if its associated pixel is a relevant pixel and $w_{kl}$ is set to $m_2$ if the associated pixel is a causal irrelevant pixel such that $$\frac{m_1}{m_2} > 1.$$

10. The method of claim 7 wherein $w_{kl}$ is set to $m_1$ if its associated pixel is a relevant pixel and $w_{kl}$ is set to $m_2$ if the associated pixel is a causal irrelevant pixel such that $$\frac{m_1}{m_2} = 2.$$

11. A method of decomposing an image comprising the steps of:
   a) decomposing the image into a plurality of stripes;
   b) decomposing each stripe into foreground and background image layers, and a mask layer; and
   c) applying a smoothing filter to interpolate irrelevant pixel values in the foreground and background layers for wavelet encoding efficiency
   wherein step b) further comprises the steps of:
      i) dividing a selected layer into a plurality of decision regions($D_{ij}$) and associated analysis regions ($A_{ij}$), wherein each $D_{ij} \subseteq A_{ij}$; and
      ii) assigning the entire region $D_{ij}$ to one of the background and foreground layers, if a contrast of $A_{ij}$ does not exceed a pre-determined threshold.

12. The method of claim 11 wherein the entire region $D_{ij}$ is assigned to the foreground or background layers based on whether the average pixel value AVG(Dij) is closer to an average pixel value of neighboring foreground regions or neighboring background regions.

13. The method of claim 11 wherein step b) further comprises the steps of:
      iii) distributing the pixels of $D_{ij}$ between the background and foreground layers, if a contrast of $A_{ij}$ exceeds a pre-determined threshold.

14. The method of claim 13, wherein step b)(ii) further comprises the steps of:
   i) separating the pixels of $A_{ij}$ into two groups, GROUP_1 and GROUP_2;
   ii) compute an average (AVG_1, AVG_2) for each group; and
   iii) mutually exclusively assigning the pixels of $D_{ij}$ GROUP_1 and GROUP_2 to a selected one of the foreground and background layers based on a comparison of the relative luminance of GROUP_1 and GROUP_2.

15. A method of preparing an image for efficient wavelet transform compression, comprising the steps of:
   a) separating the image into foreground and background image layers, and a mask layer; and
   b) applying a smoothing filter to interpolate irrelevant pixel values in the foreground and background layers for coder efficiency,
   wherein step a) further comprises
      i) dividing a selected layer into a plurality of decision regions($D_{ij}$) and associated analysis regions ($A_{ij}$), wherein each $D_{ij} \subset A_{ij}$.
      ii) assigning the entire region $D_{ij}$ to one of the background and foreground layers, if a contrast of $A_{ij}$ does not exceed a pre-determined threshold, and
      iii) distributing the pixels of $D_{ij}$ between the background and foreground layers, if a contrast of $A_{ij}$ exceeds a pre-determined threshold.

16. The method of claim 15 wherein a normalized weighted average of the relevant pixels and the causal irrelevant pixels contribute to the interpolated value.

17. The method of claim 15 wherein the smoothing filter is a weighted Gaussian filter.

18. The method of claim 15 wherein each element of the smoothing filter is of the form $w_{kl} V_{kl}$, wherein $V_{kl}$ is a non-weighted filter value, wherein $w_{kl}$ is a function of its associated pixel causality and relevance.

19. The method of claim 18 wherein $w_{kl} = 0$ for the center pixel ($p_c$) and any non-causal irrelevant pixel.

20. The method of claim 18 wherein $w_{kl}$ is set to $m_1$ if its associated pixel is a relevant pixel and $w_{kl}$ is set to $m_2$ if the associated pixel is a causal irrelevant pixel such that $$\frac{m_1}{m_2} > 1.$$

21. The method of claim 18 wherein $w_{kl}$ is set to $m_1$ if its associated pixel is a relevant pixel and $w_{kl}$ is set to $m_2$ if the associated pixel is a causal irrelevant pixel such that $$\frac{m_1}{m_2} = 2.$$

* * * * *